US012082704B2

(12) United States Patent
Landers et al.

(10) Patent No.: US 12,082,704 B2
(45) Date of Patent: Sep. 10, 2024

(54) COMPRESSION SET

(71) Applicant: Evonik Operations GmbH, Essen (DE)

(72) Inventors: Rüdiger Landers, Essen (DE); Daniela Hermann, Düsseldorf (DE); Isabelle Denise Wessely, Karlsruhe (DE); Michael Ferenz, Essen (DE); Rainer Ziegler, Herne (DE)

(73) Assignee: Evonik Operations GmbH, Essen (DE)

( * ) Notice: Subject to any disclaimer, the term of this patent is extended or adjusted under 35 U.S.C. 154(b) by 457 days.

(21) Appl. No.: 17/070,254

(22) Filed: Oct. 14, 2020

(65) Prior Publication Data

US 2021/0137276 A1 May 13, 2021

(30) Foreign Application Priority Data

Nov. 7, 2019 (EP) .................................... 19207810

(51) Int. Cl.
| | |
|---|---|
| *A47C 27/00* | (2006.01) |
| *A47C 27/08* | (2006.01) |
| *A47C 27/14* | (2006.01) |
| *C08G 18/46* | (2006.01) |
| *C08G 18/48* | (2006.01) |
| *C08G 18/50* | (2006.01) |
| *C08G 18/76* | (2006.01) |
| *C08G 77/46* | (2006.01) |
| *C08J 9/00* | (2006.01) |
| *C08J 9/04* | (2006.01) |

(52) U.S. Cl.
CPC ........ *A47C 27/088* (2013.01); *C08G 18/5045* (2013.01); *C08G 2110/0008* (2021.01); *C08G 2110/0041* (2021.01)

(58) Field of Classification Search
CPC .................................................... C08J 9/0042
See application file for complete search history.

(56) References Cited

U.S. PATENT DOCUMENTS

| | | | |
|---|---|---|---|
| 2,834,748 A | 5/1958 | Bailey et al. | |
| 2,917,480 A | 12/1959 | Bailey et al. | |
| 3,346,557 A | 10/1967 | Patton, Jr. et al. | |
| 3,629,308 A | 12/1971 | Bailey et al. | |
| 3,933,695 A | 1/1976 | Omietanski et al. | |
| 4,042,540 A | 8/1977 | Lammerting et al. | |
| 4,147,847 A | 4/1979 | Schweiger | |
| 4,347,330 A * | 8/1982 | Demou .............. | C08G 18/4833 521/110 |
| 4,855,379 A | 8/1989 | Budnik et al. | |
| 5,231,051 A | 7/1993 | Baldi et al. | |
| 5,306,737 A | 4/1994 | Burkhart et al. | |
| 5,357,018 A | 10/1994 | Burkhart et al. | |
| 5,844,010 A | 12/1998 | Burkhart et al. | |
| 6,359,022 B1 | 3/2002 | Hickey et al. | |
| 7,671,103 B2 | 3/2010 | Eilbracht | |
| 7,671,104 B2 | 3/2010 | Heinemann et al. | |
| 8,334,355 B2 | 12/2012 | Henning et al. | |
| 10,787,464 B2 | 9/2020 | Fiedel et al. | |
| 2006/0167125 A1 | 7/2006 | Bauer et al. | |
| 2007/0072951 A1 | 3/2007 | Bender et al. | |
| 2007/0219284 A1* | 9/2007 | Sasaki ..................... | C08L 75/08 521/172 |
| 2007/0238800 A1 | 10/2007 | Neal et al. | |
| 2007/0270518 A1 | 11/2007 | Nutzel | |
| 2007/0282026 A1 | 12/2007 | Grigsby, Jr. et al. | |
| 2008/0234402 A1 | 9/2008 | Lehmann et al. | |
| 2008/0277360 A1* | 11/2008 | Ecker ........................ | A47F 7/30 119/28.5 |
| 2009/0012197 A1* | 1/2009 | Landers ............... | C08G 18/165 524/588 |
| 2009/0088489 A1 | 4/2009 | Terheiden et al. | |
| 2012/0190762 A1 | 7/2012 | Hubel et al. | |
| 2020/0377684 A1 | 12/2020 | Hermann et al. | |
| 2021/0015269 A1 | 1/2021 | Terheiden et al. | |
| 2021/0047474 A1 | 2/2021 | Klostermann et al. | |
| 2021/0253780 A1 | 8/2021 | Wessely et al. | |

FOREIGN PATENT DOCUMENTS

| | | |
|---|---|---|
| CN | 1291619 | 4/2001 |
| DE | 2 533 074 A1 | 3/1976 |
| DE | 4 229 402 A1 | 3/1994 |
| DE | 4 239 054 A1 | 5/1994 |
| DE | 10 2004 001 408 A1 | 7/2005 |
| DE | 10 2007 046 860 A1 | 4/2009 |
| EP | 0 380 993 A2 | 8/1990 |
| EP | 0 493 836 A1 | 7/1992 |
| EP | 0 533 202 A1 | 3/1993 |
| EP | 0 780 414 A2 | 6/1997 |
| EP | 0 839 852 A2 | 5/1998 |
| EP | 0 656 382 B1 | 8/1998 |
| EP | 0 867 465 A1 | 9/1998 |
| EP | 1 161 474 | 12/2001 |
| EP | 1 537 159 A1 | 6/2005 |
| EP | 1 544 235 A1 | 6/2005 |
| EP | 1 678 232 A2 | 7/2006 |
| EP | 1 712 578 A1 | 10/2006 |

(Continued)

OTHER PUBLICATIONS

Machine translation of JP-H07224141-A obtained from Clarivate Analytics in Feb. 2023 (Year: 2023).*
Herrmann et al., U.S. Appl. No. 17/448,240, filed Sep. 21, 2021.
Ferenz et al., U.S. Appl. No. 17/523,059, filed Nov. 10, 2021.
Glos et al., U.S. Appl. No. 17/414,678, filed Jun. 16, 2021.
Glos et al., U.S. Appl. No. 17/414,726, filed Jun. 16, 2021.
Maier et al., U.S. Appl. No. 17/542,614, filed Dec. 6, 2021.
Modro et al., U.S. Appl. No. 17/367,456, filed Jul. 5, 2021.
Wagner et al., U.S. Appl. No. 17/391,664, filed Aug. 2, 2021.

*Primary Examiner* — Melissa A Rioja
(74) *Attorney, Agent, or Firm* — Grüneberg and Myers PLLC

(57) ABSTRACT

What are described are shaped hot-cure flexible PU foam articles, preferably mattresses and/or cushions, wherein the hot-cure flexible polyurethane foam has been obtained by reaction of at least one polyol component and at least one isocyanate component in the presence of at least one compound of formula (1a) and at least one compound of formula (1b) and at least one blowing agent and at least one catalyst.

22 Claims, 3 Drawing Sheets

(56) References Cited

FOREIGN PATENT DOCUMENTS

| | | |
|---|---|---|
| EP | 1 977 825 A1 | 10/2008 |
| EP | 1 985 642 A1 | 10/2008 |
| EP | 1 985 644 A1 | 10/2008 |
| EP | 2 182 020 A1 | 5/2010 |
| EP | 2 481 770 A2 | 8/2012 |
| JP | H07224141 A * | 8/1995 |
| WO | 96/12759 A2 | 5/1996 |
| WO | 00/47647 A1 | 8/2000 |
| WO | WO-0056805 A1 * | 9/2000 ......... C08G 18/4072 |
| WO | 00/58383 | 10/2000 |
| WO | 2004/020497 A1 | 3/2004 |
| WO | 2005/033167 A2 | 4/2005 |
| WO | 2005/085310 A2 | 9/2005 |
| WO | 2005/118668 A1 | 12/2005 |
| WO | 2007/111828 A2 | 10/2007 |

* cited by examiner

COMPRESSION SET

CROSS REFERENCE TO RELATED APPLICATIONS

This application is a 35 U.S.C. § 119 patent application which claims the benefit of European Application No. 19207810.3 filed Nov. 7, 2019, which is incorporated herein by reference in its entirety.

FIELD

The present invention is in the field of polyurethane (PU) foams. It especially relates to the provision of shaped hot-cure flexible PU foam articles, for example mattresses and/or cushions.

BACKGROUND

Shaped hot-cure flexible PU foam articles, for example hot-cure flexible PU foam-containing mattresses and/or cushions, have long been known from the prior art and are employed worldwide. There has been no shortage of attempts to achieve ever greater improvements. The need for optimization has not been fully satisfied to the present day.

One problem with regard to shaped hot-cure flexible PU foam articles is the transport and storage thereof. Shaped hot-cure flexible PU foam articles, for example mattresses, are very bulky and are therefore often compressed, especially compressed and vacuum-packed, for storage and transport due to space considerations. Large distributors are increasingly shipping certain mattresses in compressed and rolled-up form.

Such packagings are widely used for mattresses in particular. In vacuum packaging the mattress is placed in a bag made of plastic film for example. The thus prepackaged mattress is then placed in a press and compressed with one end of the bag open. The air escapes. The open end of the bag is then welded shut in an airtight manner. The thus obtained vacuum packaging is then rolled up and placed inside an outer bag. The mattress cannot re-expand since the outer bag keeps it in rolled-up form.

Flattening a mattress to the extent achieved by a machine during rolling for example requires a force between 40 000 and 250 000 N depending on the mattress. This corresponds to the weight exerted by a mass of 4 to 25 tons.

As is immediately apparent, such a force in connection with the compression of shaped hot-cure flexible PU foam articles may result in material fatigue. It is a very relevant problem to provide shaped hot-cure flexible PU foam articles which even after extended compression are capable of recovering their original dimensions.

SUMMARY

Against this backdrop the present invention specifically has for its object to provide shaped hot-cure flexible PU foam articles such as in particular hot-cure flexible PU foam-containing mattresses and/or cushions that have good capability of recovering their original shape after compression over a period of at least 20 hours.

In the context of the present invention it has now been found that, surprisingly, this object can be achieved by the subject matter of the invention.

DETAILED DESCRIPTION

This invention provides a shaped hot-cure flexible PU foam article, preferably mattress and/or cushion, wherein the hot-cure flexible PU foam has been obtained by reaction of at least one polyol component and at least one isocyanate component in the presence of at least one compound of formula (1a) and at least one compound of formula (1b) and at least one blowing agent and at least one catalyst, where

Formula (1a):

with
  $a=2$ to 10, preferably 2 to 8, more preferably 2 to 5
  $b=25$ to 200, preferably 40 to 150, more preferably 45 to 120
  $c=2$ to 40, preferably 2 to 30, more preferably 3 to 20
  $d=0$ to 10, preferably 0 to 8, more preferably 0 to 5
  $e=0$ to 5, preferably 0 to 3, more preferably 0 to 2
  where:
  $a+b+c+d+e>48$
  $R^1=$Me or $R^2$
  $R^2=$identical or different polyethers obtainable from the polymerization of ethylene oxide, propylene oxide and/or other alkylene oxides such as butylene oxide or styrene oxide, preferably polyethers of the general formula (c),

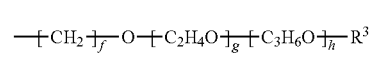

Formula (c)

where
  $f=0-6$, preferably 0-4, more preferably 0 or 3
  $g=0$ to 150, preferably 3 to 100, more preferably 3 to 70
  $h=0$ to 150, preferably 0 to 100, more preferably 0 to 80
  where
  $g+h>0$
  $R^3=$OH, alkyl or acetyl, preferably OH, $C_1$ to $C_6$-alkyl or acetyl, more preferably OH, methyl, acetyl or butyl
and where

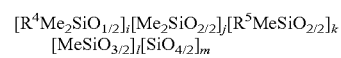

Formula (1b):

with
  $i=2$ to 10, preferably 2 to 8, more preferably 2 to 5
  $j=0$ to 20, preferably 0 to 18, more preferably 0 to 15
  $k=0$ to 20, preferably 0 to 15, more preferably 0 to 10
  $l=0$ to 10, preferably 0 to 8, more preferably 0 to 5
  $m=0$ to 5, preferably 0 to 3, more preferably 0 to 2
  where:
  $i+j+k+l+m<20$
  $R^4=$Me or $R^5$
  $R^5=$identical or different polyethers obtainable from the polymerization of ethylene oxide, propylene oxide and/or other alkylene oxides such as butylene oxide or styrene oxide, preferably polyethers of the general formula (d), or alkyl $C_3$ to $C_{15}$,

Formula (d)

where
  $n=0-6$, preferably 0-4, more preferably 0 or 3
  $o=0$ to 100, preferably 0 to 50, more preferably 0 to 25
  $p=0$ to 100, preferably 0 to 50, more preferably 0 to 25
  where
  $o+p>0$
  $R^6=$OH, alkyl or acetyl, preferably OH, $C_1$ to $C_6$-alkyl or acetyl, more preferably OH, methyl, acetyl or butyl.

The formulae (1a) and (1b) should be regarded as average empirical formulae.

The figures FIG. 1 to 3 show the results of rolling deformation tests as a function of air permeability. The rolling deformation test is elucidated in detail further down. It permits the assessment of dimensional recovery of the shaped PU foam body after compression. Air permeability is a measure of the porosity of the PU foam in question. The result of the rolling deformation test is plotted on the ordinate in each case. Air permeability is plotted on the abscissa in each case. The figures FIG. 1 to FIG. 3 illustrate that the inventive use of at least one compound of the formula (1a) and of at least one compound of the formula (1b) in the production of hot-cure flexible PU foam enables improved dimension recovery of the shaped PU foam article after compression, with comparable porosity.

Optionally, it is advantageously possible also to additionally use further customary additives, active substances and auxiliaries. Mattresses are very particularly preferred in the context of the present invention. This advantageously also applies to all of the following preferred embodiments.

Advantageously, the shaped hot-cure flexible PU foam article thus provided using the compounds of formulae (1a) and (1b) therefore has good capability of recovering its original shape even after extended compression over a period of at least 20 hours.

A further advantage is that the shaped hot-cure flexible PU foam articles in question are particularly low in emissions with regard to emissions of low molecular weight linear and cyclic siloxanes.

What is meant more particularly in the context of the present invention by "low in emissions" with regard to low molecular weight siloxanes is that the hot-cure flexible PU foam that results in accordance with the invention has a siloxane emission of $\geq 0$ $\mu g/m^3$ to $\leq 500$ $\mu g/m^3$, preferably $\leq 200$ $\mu g/m^3$, more preferably $\leq 100$ $\mu g/m^3$, appropriately determined by the test chamber method based on DIN standard DIN EN ISO 16000-9:2008-04, 24 hours after test chamber loading. This method is described precisely in EP 3205680A1, specifically in paragraph [0070], which is hereby incorporated by reference.

A further advantage is that the shaped hot-cure flexible PU foam articles in question can also meet emissions specifications such as CertiPur. What is meant here by low in emissions according to CertiPur is that total emissions of volatile organic substances (TVOCs) are less than 500 $\mu g/m^3$. Further technical details of the requirements for the CertiPUR standard (Version 1. July 2017) can be found at: https://www.europur.org/images/CertiPUR_Technical_Paper_-_Full_Version_-_2017.pdf. This latter document (Version 1. July 2017) can also be ordered directly at EUROPUR, Avenue de Cortenbergh 71, B-1000 Brussels, Belgium.

PU foams (polyurethane foams) and the production thereof are well known to those skilled in the art and, per se, require no further elucidation. Shaped articles in the context of the invention are shaped bodies of different shape. Preferred shapes in the context of the invention are, for example, geometries such as spheres, cuboids, cylinders etc. Shaped PU foam articles in the context of the invention are thus shaped bodies made of polyurethane foam. Particularly preferred shaped hot-cure flexible PU foam articles in the context of the present invention are mattresses and/or cushions and also foam blocks in general.

Mattresses per se and the production thereof are known. They usually consist of a mattress core, e.g. comprising foam, latex, natural products and/or a spring core, and a cover surrounding the mattress. A corresponding situation applies to cushions. In the context of the present application, the term mattress and/or cushion is understood to mean that at least one section made of flexible hot-cure PU foam is present in the mattress and/or the cushion. This preferably means that at least part of the mattress and/or cushion consists of flexible hot-cure PU foam. Based on the total weight of the mattress and/or of the cushion, this part can account for at least 1% by weight or 5% by weight or 25% by weight, preferably at least 50% by weight, in particular at least 75% by weight. It is also possible for the mattress and/or the cushion to consist entirely of flexible hot-cure PU foam, apart from the cover.

The production of polyurethane foam in general is known per se. It is formed by the tried and tested reaction of at least one polyol component and at least one isocyanate component in the presence of at least one blowing agent (e.g. water) in a polyaddition reaction. It is essential to the present invention that the foam is a flexible hot-cure PU foam and this reaction is carried out in the presence of at least one compound of formula (1a) and at least one compound of formula (1b) as defined hereinabove in each case.

The polyurethane foam according to the invention is a hot-cure flexible polyurethane foam, or a combination of these flexible PU foams is used, for example two of these flexible PU foams. The term "flexible hot-cure PU foam" is known per se to the person skilled in the art; this is a fixed technical term which is correspondingly established in the specialist field, but will nevertheless be elucidated briefly here.

Flexible PU foams are elastic and deformable and usually have open cells. As a result, the air can escape easily on compression. In addition, there are also rigid PU foams that are inelastic and usually have closed cells, are used for insulation purposes and are not in the focus of the present invention. There exists a wide variety of flexible PU foams. For instance, the person skilled in the art is aware inter alia of ester foams (made from polyester polyols), flexible hot-cure PU foams and cold-cure PU foams. Viscoelastic flexible PU foams are a relatively new type which is counted among the hot-cure flexible PU foams. In the context of the present invention, therefore, viscoelastic flexible PU foams are also encompassed by the term "flexible hot-cure PU foams". The crucial difference between a hot-cure flexible PU foam and a cold-cure PU foam lies in the different mechanical properties. It is possible to differentiate between flexible hot-cure PU foams and flexible cold-cure PU foams via rebound resilience in particular, also called ball rebound (BR) or resilience. A method of determining the rebound resilience is described, for example, in DIN EN ISO 8307:2008-03. Here, a steel ball having a fixed mass is allowed to fall from a particular height onto the test specimen and the height of the rebound in % of the drop height is then measured. The values in question for a cold-cure flexible PU foam are preferably in the region of >50%. Cold-cure flexible PU foams are therefore also often referred to as HR foams (HR: High Resilience). By contrast, hot-cure flexible PU foams have rebound values of preferably 1% to not more than 50%. In the context of a preferred embodiment of the invention, the hot-cure flexible PU foams according to the invention therefore have rebound values of preferably 1% to not more than 50%, determinable in accordance with DIN EN ISO 8307:2008-03. A further mechanical criterion is the sag or comfort factor. In this case, a foam sample is compressed in accordance with DIN EN ISO 2439 and the ratio of compressive stress at 65% and 25% compression is measured. Cold-cure flexible PU foams here have a sag or comfort factor of preferably >2.5. Hot-cure flexible PU foams have a value of preferably <2.5. In a preferred embodiment of the invention, the hot-cure flexible PU foams of the invention therefore have a sag or comfort factor of preferably <2.5, determinable as specified above.

An exact definition of the properties can also be taken, for example, from the data sheet "PUR-Kaltschaum" [Cold-Cure PU Foam] from the Fachverband Schaumkunststoffe und Polyurethane e.V. [Specialist Association Foamed Plastics and Polyurethanes], Reference KAL20160323, last update 23.03.2016. (https://www.fsk-vsv.de/wp-content/uploads/2017/03/Produktbeschreibung-PUR-Kaltschaum.pdf). This data sheet can also be ordered directly from the Fachverband Schaumkunststoffe und Polyurethane e.V. (FSK), postal address: Stammheimerstr. 35, D-70435 Stuttgart.

The two names hot-cure flexible PU foam and cold-cure flexible PU foam are explained by the historical development of PU technology, and do not necessarily mean that different temperatures occur in the foaming process.

The different mechanical properties of hot-cure PU foams and cold-cure PU foams result from differences in the formulation for production of the foams. In the case of a cold-cure flexible PU foam, predominantly high-reactivity polyols having primary OH groups and average molar mass >4000 g/mol are usually used. Optionally, low molecular weight crosslinkers are also used, and it is also possible for the function of the crosslinker to be assumed by higher-functionality isocyanates. In the case of hot-cure flexible PU foams, comparatively predominantly unreactive polyols having secondary OH groups and an average molar mass of <4000 g/mol are usually used. In the case of cold-cure flexible PU foams, reaction of the isocyanate groups with the hydroxyl groups thus occurs as early as in the expansion phase ($CO_2$ formation from —NCO and $H_2O$) of the foam. This rapid polyurethane reaction usually leads, as a result of a viscosity increase, to a relatively high intrinsic stability of the foam during the blowing process. As a result, other foam stabilizers with different siloxane structures compared to hot-cure flexible PU foams are required, which is the reason why the present invention does not extend to cold-cure flexible PU foams. Cold-cure flexible PU foams are usually highly elastic foams. Due to the high intrinsic stability, the cells have generally not been opened sufficiently at the end of the foaming operation and the cell structure additionally has to be open by mechanical crushing. In the case of hot-cure flexible PU foams, by contrast, this is not normally necessary. Significantly greater stabilization by high molecular weight polyethersiloxane structures is important here. Correspondingly highly active stabilizers are defined by formula (1a). In the case of hot-cure flexible PU foams according to the invention, as well as a stabilizer of formula (1a), a silicone compound of the formula (1b) is additionally used in the production.

Open-cell hot-cure flexible PU foams preferably have a gas permeability (also called "porosity") within a range from 1 to 6.5 scfm. This is measured by applying a pressure differential and measuring the volume of air that flows through in accordance with ASTM D 3574 (2011-00). The method is elucidated in detail in the Examples (see Porosity determined by the flow method therein). Scfm (standard cubic feet per minute) is measured under standard conditions (23° C., 100 kPa).

Depending on the application, hot-cure flexible PU foams preferably have a foam density between 8 and 80 kg/m³. Especially when such hot-cure flexible PU foams are used as mattresses, mattress constituents and/or cushions, said foams are differentiated according to regional wants and needs, requirements and preferences of consumers. The preferred hot-cure flexible PU foam for mattress applications has a foam density of preferably 25-30 kg/m³.

A specific class of hot-cure flexible PU foams is that of viscoelastic PU foams. These are also known as "memory foam" and exhibit both a low rebound resilience (preferably <10%) and a slow, gradual recovery after compression (recovery time preferably 2-10 s). Materials of this kind are well known in the prior art and are highly valued for, in particular, their energy- and sound-absorbing properties too. Typical viscoelastic flexible foams usually have a lower porosity and a high density (or a high foam density (FD)) compared to other hot-cure flexible PU foams. Cushions have a foam density of preferably 30-50 kg/m³ and are thus at the lower end of the density scale typical of viscoelastic foams, whereas viscoelastic PU foams for mattresses preferably have a density in the range of 50-130 kg/m³.

In hot-cure flexible PU foams, the hard (high glass transition temperature) and soft (low glass transition temperature) segments become oriented relative to one another during the reaction and then spontaneously separate from one another to form morphologically different phases within the "bulk polymer". Such materials are also referred to as "phase-separated" materials. The glass transition temperature in the case of viscoelastic foams is preferably between −20 and +15° C. The glass transition temperature of other hot-cure flexible PU foams and cold-cure flexible PU foams, by contrast, is usually below −35° C. Such "structural viscoelasticity" in the case of open-cell viscoelastic hot-cure flexible PU foams which is based essentially on the glass transition temperature of the polymer should be distinguished from a pneumatic effect. In the latter case, the cell structure is relatively closed (low porosity). As a result of the low air permeability, the air flows back in only gradually after compression, which results in slowed recovery.

With regard to the foam stabilizers used, in the context of the invention, compounds of the formula (1a) are used for viscoelastic PU foams. Addition of the compound having the formula (1b) especially results in an improvement in roll compression properties that is in accordance with the invention. If flexible hot-cure PU foams are described hereinafter, this also includes viscoelastic flexible PU foams—if they are not mentioned separately.

Various hot-cure flexible PU foams are classified not only according to foam density but often also according to their compressive strength, also referred to as load-bearing capacity, for particular applications. For instance, compressive strength CLD (compression load deflection), 40% in accordance with DIN EN ISO 3386-1:2015-10, for hot-cure flexible PU foams is preferably in the range of 2.0-8.0 kPa; viscoelastic polyurethane foams preferably have values of 0.1-5.0 kPa, especially 0.5-2.5 kPa.

In a preferred embodiment of the invention, the hot-cure flexible PU foams to be used in accordance with the invention have the following preferred properties in respect of rebound resilience, foam density and/or porosity: a rebound resilience of 1% to 50%, measured in accordance with DIN EN ISO 8307:2008-03, and/or a foam density of from 5 to 150 kg/m³ and/or a porosity of 1 to 6 scfm, especially 1.5 to 4.5 scfm, more preferably 1.75 to 4.25 scfm. Particular preference is given to all 3 criteria in respect of rebound resilience, foam density and/or porosity, as indicated above, being satisfied. In particular, the hot-cure flexible PU foam used according to the invention has a compressive strength CLD, 40% in accordance with DIN EN ISO 3386-1:2015-10, of 0.1 to 8.0 kPa.

Hot-cure flexible PU foams and production thereof are known per se. For the purposes of the present invention, in a preferred embodiment, it is a particular feature of hot-cure flexible PU foam that it has a compressive strength CLD, 40% in accordance with DIN EN ISO 3386-1:2015-10, of 2.0-8.0 kPa and/or a rebound resilience of 1-50%, measured in accordance with DIN EN ISO 8307:2008-03, and/or a foam density of 8 to 80 kg/m$^3$ and/or a porosity of 1 to 6 scfm, especially 1.5 to 4.5 scfm, more preferably 1.75 to 4.25 scfm. A possible production method is described, for example, in EP 2 481 770 A2 or EP 2 182 020 A1. For the purposes of the present invention, in a preferred embodiment, it is a particular feature of viscoelastic flexible PU foam that it has a glass transition temperature between −20° C. and +15° C. and/or a compressive strength CLD, 40% in accordance with DIN EN ISO 3386-1:2015-10, of 0.1-5.0 kPa, especially 0.5-2.5 kPa, and/or a rebound resilience of <10%, measured in accordance with DIN EN ISO 8307: 2008-03, and/or a foam density of 30 to 130 kg/m$^3$ and/or a porosity (after crushing the foam) of 1 to 6 scfm, especially 1.5 to 4.5 scfm, more preferably 1.75 to 4.25 scfm. A possible method of production is described, for example, in WO 2013/131710 A2. The glass transition temperature can be measured by means of dynamic mechanical analysis (DMA) (DIN 53513:1990-03) or by means of differential calorimetry (DSC) (ISO 11357-2:2013). Strictly speaking, it is a glass transition range which extends over a temperature range. Values reported are therefore averages.

The shaped hot-cure flexible PU foam article according to the invention, especially the mattress according to the invention, in a preferred embodiment of the invention, has a height of at least 1 cm to not more than 50 cm and a width of from at least 20 cm to not more than 300 cm, and a length of at least 20 cm to not more than 300 cm. Preferred dimensions are, for example, heights in the range from 5 cm to 40 cm, widths in the range from 70 cm to 200 cm, lengths in the range from 150 cm to 220 cm. The shaped PU foam article according to the invention, especially the cushion according to the invention, in a preferred embodiment of the invention, may also have a height of at least 1 cm to not more than 40 cm and a width of at least 15 cm to not more than 200 cm and a length of at least 15 cm to not more than 200 cm, examples of preferred dimensions being heights in the range from 2 cm to 30 cm, widths in the range from 15 cm to 50 cm, lengths in the range from 15 cm to 50 cm.

In a further preferred embodiment of the invention, the shaped hot-cure flexible PU foam article takes the form of a mattress and preferably the form of a multizone mattress. The different zones differ in terms of, in particular, the respective hardness. Such multizone mattresses and the production thereof are known per se. They are widely sold commercially. In particular, the mattress has up to seven zones of differing hardness which extend over the longitudinal direction of the mattress and are given the appropriate width. When the mattress has various hardness zones distributed over its area, which are formed, in particular, by cuts and/or hollow spaces in the mattress, this constitutes a further preferred embodiment of the invention.

In a further preferred embodiment of the invention, the shaped hot-cure flexible PU foam article may also be a cold-cure PU foam mattress, a viscoelastic flexible PU foam mattress, a hot-cure flexible PU foam mattress, a PU gel foam mattress, a latex mattress or a box spring mattress, each containing at least a portion made of a hot-cure flexible PU foam according to the invention. These types of mattress are known per se to those skilled in the art and are also marketed worldwide under these names. Mattresses made solely of hot-cure flexible PU foam are usually referred to on the market simply as foam mattresses. The term mattress as used for the purposes of the present invention also encompasses corresponding mattress coverings and underlays.

In a preferred embodiment of the invention, the shaped hot-cure flexible PU foam article, preferably the mattress, has the feature that based on its starting volume the shaped hot-cure flexible PU foam article is compressed by at least 20%, preferably at least 30%, in particular at least 40%, and kept in compressed form by an auxiliary means, in particular packaging means, for at least 20 hours.

Suitable auxiliary means, in particular packaging means, are bags and/or films such as are known from the field of roll-up mattresses for example. The bags and/or films may be sealed by any desired means, such as by a clip, or by an adhesive tape or by welding. The function of the auxiliary means is that of maintaining the compressed shape until the end user of the shaped hot-cure flexible PU foam article wishes to use said shaped article again in the normal way. After removal of the auxiliary means, in particular the packaging means, the compressed shaped article expands again and in the optimal case recovers its original shape and size. The present invention makes it possible to allow improved dimensional recovery after compression over a period of at least 20 hours.

In a further preferred embodiment, the shaped hot-cure flexible PU foam article is in a compressed and vacuum-packed state and in particular is a roll-up mattress in a vacuum-packed and compressed state.

The provision of the various hot-cure flexible PU foams which can be used in the context of the present invention is known per se and it is possible to make use of all proven processes with the proviso that the hot-cure flexible PU foam is produced in the presence of at least one compound of formula (1a) and at least one compound of formula (1b).

The production of corresponding hot-cure flexible PU foams in principle requires no further explanation, but some preferred details of the production of the PU foam used for the purposes of the invention are given below. The subject matter of the invention will be described by way of example below, without any intention that the invention be restricted to these illustrative embodiments. Where ranges, general formulae or classes of compounds are specified below, these are intended to encompass not only the corresponding ranges or groups of compounds which are explicitly mentioned but also all subranges and subgroups of compounds which can be obtained by removing individual values (ranges) or compounds. Where documents are cited in the context of the present description, the entire content thereof, particularly with regard to the subject matter that forms the context in which the document has been cited, is intended to form part of the disclosure content of the present invention. Unless stated otherwise, percentages are figures in percent by weight. When average values are reported below, the values in question are weight averages, unless stated otherwise. Where parameters which have been determined by measurement are reported below, the measurements have been carried out at a temperature of 23° C. and a pressure of 100 kPa, unless stated otherwise. Unless stated otherwise, compression of the foam in the context of the present invention means that the foam is preferably compressed by at least 20%, based on its starting volume, in particular over a period of at least 20 hours.

For the purposes of the present invention, polyurethanes are all reaction products derived from isocyanates, in particular polyisocyanates, and appropriately isocyanate-reactive molecules. These include polyisocyanurates, polyureas, and allophanate-, biuret-, uretdione-, uretonimine- or carbodiimide-containing isocyanate or polyisocyanate reaction products. It will be apparent that a person skilled in the art seeking to produce the different flexible polyurethane foam types, for example hot-cure flexible PU foams, will appropriately select the substances necessary for each respective purpose, such as isocyanates, polyols, stabilizers, surfactants, etc., in order to obtain the polyurethane type, especially polyurethane foam type, desired in each case. Further details of the usable starting materials, catalysts and auxiliaries and additives can be found, for example, in Kunststoffhandbuch [Plastics Handbook], volume 7, Polyurethane [Polyurethanes], Carl-Hanser-Verlag Munich, 1st edition 1966, 2nd edition 1983 and 3rd edition 1993. The compounds, components and additives which follow are mentioned merely by way of example and can be replaced and/or supplemented by other substances known to those skilled in the art.

The isocyanate components used are preferably one or more organic polyisocyanates having two or more isocyanate functions. Polyol components used are preferably one or more polyols having two or more isocyanate-reactive groups.

Isocyanates suitable as isocyanate components for the purposes of this invention are all isocyanates containing at least two isocyanate groups. Generally, it is possible to use all aliphatic, cycloaliphatic, arylaliphatic and preferably aromatic polyfunctional isocyanates known per se. Isocyanates are preferably used in a range from 60 to 350 mol %, more preferably in a range from 60 to 140 mol %, relative to the sum total of the isocyanate-consuming components.

Specific examples are alkylene diisocyanates having 4 to 12 carbon atoms in the alkylene radical, e.g. dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate (HMDI), cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (isophorone diisocyanate or IPDI for short), hexahydrotolylene 2,4- and 2,6-diisocyanate and also the corresponding isomer mixtures, and preferably aromatic diisocyanates and polyisocyanates, for example tolylene 2,4- and 2,6-diisocyanate (TDI) and the corresponding isomer mixtures, mixtures of diphenylmethane 2,4'- and 2,2'-diisocyanates (MDI) and polyphenylpolymethylene polyisocyanates (crude MDI) and mixtures of crude MDI and tolylene diisocyanates (TDI). The organic diisocyanates and polyisocyanates can be used individually or in the form of mixtures thereof.

It is also possible to use isocyanates which have been modified by the incorporation of urethane, uretdione, isocyanurate, allophanate and other groups, called modified isocyanates.

Particularly suitable organic polyisocyanates which are therefore used with particular preference are various isomers of tolylene diisocyanate (tolylene 2,4- and 2,6-diisocyanate (TDI), in pure form or as isomer mixtures of various composition), diphenylmethane 4,4'-diisocyanate (MDI), "crude MDI" or "polymeric MDI" (contains the 4,4' isomer and also the 2,4' and 2,2' isomers of MDI and products having more than two rings) and also the two-ring product which is referred to as "pure MDI" and is composed predominantly of 2,4' and 4,4' isomer mixtures, and prepolymers derived therefrom. Examples of particularly suitable isocyanates are detailed, for example, in EP 1712578, EP 1161474, WO 00/58383, US 2007/0072951, EP 1678232 and WO 2005/085310, which are hereby fully incorporated by reference.

Polyols suitable as polyol component for the purposes of the present invention are all organic substances having two or more isocyanate-reactive groups, preferably OH groups, and also formulations thereof. Preferred polyols are all polyether polyols and/or hydroxyl-containing aliphatic polycarbonates which are customarily used for producing polyurethane systems, in particular polyurethane foams, in particular polyether polycarbonate polyols and/or filled polyols (polymer polyols) such as SAN, PHD and PIPA polyols which contain solid organic fillers up to a solids content of 40% or more in dispersed form, and/or autocatalytic polyols which contain catalytically active functional groups, in particular amino groups, and/or polyols of natural origin, known as "natural oil-based polyols" (NOPs). The polyols for hot-cure flexible PU foam preferably have a functionality of 1.8 to 8 and number-average molecular weights in the range from 500 to 4000 g/mol. The polyols having OH numbers in the range from 25 to 400 mg KOH/g are typically used. The number-average molecular weights are typically determined by gel permeation chromatography (GPC), especially using polypropylene glycol as reference substance and tetrahydrofuran (THF) as eluent. The OH numbers can be determined, in particular, in accordance with the DIN standard DIN 53240:1971-12. Depending on the required properties of the resulting foams, it is possible to use appropriate polyols, as described for example in: US 2007/0072951 A1, WO 2007/111828, US 2007/0238800, U.S. Pat. No. 6,359,022 or WO 96/12759. Further polyols are known to those skilled in the art and can be found, for example, in EP-A-0380993 or U.S. Pat. No. 3,346,557.

In a preferred embodiment of the invention, especially for production of flexible slabstock foam, polyether alcohols having secondary hydroxyl groups in amounts of preferably above 50%, more preferably above 90%, are used, especially those having a propylene oxide block or random propylene oxide and ethylene oxide block at the chain end, or those based solely on propylene oxide blocks. Such polyether alcohols preferably have a functionality of 2 to 8, more preferably 2 to 4, number-average molecular weights in the range from 500 to 4000 g/mol, preferably 800 to 4000 g/mol, more preferably 2500 to 4000 g/mol, and typically OH numbers in the range from 20 to 100 mg KOH/g, preferably 40 to 60 mg KOH/g.

In a further preferred embodiment of the invention, di- and/or trifunctional polyether alcohols comprising primary hydroxyl groups in amounts of preferably above 50%, more preferably above 80%, in particular those having an ethylene oxide block at the chain end, are additionally also used. Polyols for cold-cure flexible PU foams ("HR polyols") form part of this category if the molar mass is simultaneously >4000 g/mol. According to the required properties of this embodiment which is preferred in accordance with the invention, especially for production of the abovementioned hot-cure flexible PU foams, preference is given to using not only the polyether alcohols described here but also further polyether alcohols which bear primary hydroxyl groups and are based predominantly on ethylene oxide, in particular having a proportion of ethylene oxide blocks of >70%, preferably >90% ("hypersoft polyol"). All polyether alcohols described in the context of this preferred embodiment preferably have a functionality of 2 to 8, more preferably 2 to 5, number-average molecular weights in the range from 500 to 8000 g/mol, preferably 500 to 7000 g/mol, and typically OH numbers in the range from 5 to 100 mg KOH/g, preferably 20 to 60 mg KOH/g. Polyols having primary OH functions are used here in the case of the hot-cure flexible PU foams of the invention, in a preferred embodiment, not alone but rather in combination with polyols having secondary OH groups. Polyols having primary OH functions are used here in the combination, in a preferred embodiment, only to an extent of <50%.

In a further preferred embodiment of the invention, autocatalytic polyols are used.

In a further preferred embodiment of the invention, especially for production of viscoelastic flexible PU foams, preference is given to using mixtures of various, preferably two or three, polyfunctional polyether alcohols. The polyol combinations used here typically consist of a low molecular weight "crosslinker" polyol having high functionality, preferably having an OH number of from 100 to 400 mg KOH/g, and/or a conventional high molecular weight flexible slabstock foam polyol or HR polyol and/or a "hypersoft" polyether polyol, preferably having an OH number of 20 to 40 mg KOH/g, with a high proportion of ethylene oxide and having cell-opening properties. If HR polyols are also used in the viscoelastic foam formulation, the proportion by mass thereof in the polyol mixture is <50%.

In a further preferred embodiment of the invention, recycled polyols are used.

A shaped hot-cure flexible PU foam article that has been obtained with additional use of recycled polyols accordingly corresponds to a preferred embodiment of the invention. The use of recycled polyols normally leads to problems with the recovery of shape after roll compression. In the context of the present invention, it has been found that, surprisingly, the combined use of at least one compound of the formula (1a) and at least one compound of the formula (1b), as elucidated in detail above, enables the alleviation of this problem.

Recycled polyols are polyols that are obtained from PU foam waste. This may be production waste from hot-cure flexible PU foam production or from hot-cure flexible PU foam waste after use by the consumer (for example old mattresses). In both cases, PU foam is liquefied by chemical processes. Various processes are useful here, for example, glycolysis, hydrolysis or acidolysis. The liquid recycled polyol obtained can then be reused for production of hot-cure flexible PU foam. However, such hot-cure flexible PU foams often feature distinctly adverse mechanical properties, such as resistance to roll compression. One source for further information on the use of recycled polyols in hot-cure flexible PU foams is the following BMBF research report: https://www.cleaner-production.de/fileadmin/assets/bilder/BMBF-Projekte/01RI05070-075_-_Abschlussbericht.pdf.

The additional use of recycled polyols in the context of the invention corresponds to a preferred embodiment of the invention for each item of subject-matter claimed.

A preferred ratio of isocyanate and polyol, expressed as the index of the formulation, i.e. as stoichiometric ratio of isocyanate groups to isocyanate-reactive groups (e.g. OH groups, NH groups) multiplied by 100, is in the range from 50 to 140, preferably 70 to 130, more preferably 85 to 125. An index of 100 represents a molar reactive group ratio of 1:1.

The hot-cure flexible PU foams according to the invention can also be produced using catalysts. The expression "catalysts", for the purposes of the present invention, includes all compounds known from the prior art which are able to catalyse isocyanate reactions and/or are used as catalysts, cocatalysts or activators in the production of polyisocyanate reaction products, in particular polyurethane foams.

Suitable catalysts are known; these are especially substances that catalyse the gel reaction (isocyanate-polyol), the blowing reaction (isocyanate-water) and/or the di- or trimerization of the isocyanate. Such catalysts are preferably nitrogen compounds, especially amines and ammonium salts, and/or metal compounds.

Examples of suitable nitrogen compounds as catalysts for the purposes of the present invention are the amines triethylamine, triethanolamine, diethanolamine, N,N-dimethylcyclohexylamine, N,N-dicyclohexylmethylamine, N,N-dimethylaminoethylamine, N,N,N',N'-tetramethylethane-1,2-diamine, N,N,N',N'-tetramethylpropane-1,3-diamine, N,N,N',N'-tetramethylbutane-1,4-diamine, N,N,N',N'-tetramethylhexane-1,6-diamine, N-[2-(dimethylamino)ethyl]-N,N',N'-trimethylethane-1,2-diamine, 2-[(2-(dimethylamino)ethyl)methylamino]ethanol, N',N'-dimethylpropane-1,3-diamine, N',N'-diethylpropane-1,3-diamine, 1-(2-aminoethyl)pyrrolidine, 1-(3-aminopropyl)pyrrolidine, 1-[3-(dimethylamino)propyl-(2-hydroxypropyl)amino]propan-2-ol, 2-[[3-(dimethylamino)propyl]methylamino]ethanol, 3-(2-dimethylamino)ethoxy)propylamine, N-[3-(dimethylamino)propyl]-N',N'-dimethylpropane-1,3-diamine, N'-[3-(dimethylamino)propyl]-N,N,N'-trimethylpropane-1,3-diamine, 1-[bis[3-(dimethylamino)propyl]amino]-2-propanol, N,N-bis[3-(dimethylamino)propyl]-N',N'-dimethylpropane-1,3-diamine, 1,4-diazabicyclo[2.2.2]octane, 1,4-diazabicyclo[2.2.2]octane-2-methanol, 1,2-dimethylimidazole, N-(2-hydroxypropyl)imidazole, 2-methyl-1-(2-methylpropyl)imidazole, N-(3-aminopropyl)imidazole, N-methylimidazole, 1-(3-aminopropyl)-2-methyl-1H-imidazole, N-ethylmorpholine, N-methylmorpholine, 2,2,4-trimethyl-2-silamorpholine, N-ethyl-2,2-dimethyl-2-silamorpholine, N-(2-aminoethyl)morpholine, N-(2-hydroxyethyl)morpholine, 2,2'-dimorpholinodiethyl ether, N,N'-dimethylpiperazine, N-(2-hydroxyethyl)piperazine, N-(2-aminoethyl)piperazine, N,N-dimethylbenzylamine, N,N-(dimethylamino)ethanol, N,N-(diethylamino)ethanol, 1-(2-hydroxyethyl)pyrrolidine, 3-dimethylamino-1-propanol, 1-(3-hydroxypropyl)pyrrolidine, 2-[2-(dimethylamino)ethoxy]ethanol, 2-[2-(diethylamino)ethoxy]ethanol, bis(2-dimethylaminoethyl) ether, 2-[[2-(2-(dimethylamino)ethoxy)ethyl]methylamino]ethanol, N-[2-[2-(dimethylamino)ethoxy]ethyl]-N-methylpropane-1,3-diamine, 1,3,5-tris[3-(dimethylamino)propyl]hexahydro-1,3,5-triazine, 1,8-diazabicyclo[5.4.0]undec-7-ene, 1,5-diazabicyclo[4.3.0]non-5-ene, 1,5,7-triazabicyclo[4.4.0]dec-5-ene, N-methyl-1,5,7-triazabicyclo[4.4.0]dec-5-ene, 1,4,6-triazabicyclo[3.3.0]oct-4-ene, 1,1,3,3-tetramethylguanidine, 2-tert-butyl-1,1,3,3-tetramethylguanidine, guanidine, 1,1'-[(3-{bis[3-(dimethylamino)propyl]amino}propyl)imino]dipropan-2-ol, (3-aminopropyl)bis[3-(dimethylamino)propyl]amine, 3-(dimethylamino)propylurea, 1,3-bis[3-(dimethylamino)propyl]urea, 3-dimethylamino-N,N-dimethylpropanamide, 6-(dimethylamino)hexan-1-ol and 2,4,6-tris[(dimethylamino)methyl]phenol.

Catalysts and/or mixtures of this kind are supplied commercially, for example, under the Jeffcat® ZF-10, Lupragen® DMEA, Lupragen® API, Toyocat® RX 20 and Toyocat® RX 21, DABCO® RP 202, DABCO® RP 204, DABCO® NE 300, DABCO® NE 310, DABCO® NE 400, DABCO® NE 500, DABCO® NE 600, DABCO® NE 650, DABCO® NE 660, DABCO® NE 740, DABCO® NE 750, DABCO® NE 1060, DABCO® NE 1080, DABCO® NE 1082 and DABCO® NE 2039, Niax® EF 860, Niax® EF 890, Niax® EF 700, Niax® EF 705, Niax® EF 708, Niax® EF 600, Niax® EF 602, Kosmos® 54, Kosmos® EF, and Tegoamin® ZE 1 names.

Suitable metal compounds as catalysts may be selected, for example, from the group consisting of metal-organic or organometallic compounds, metal-organic or organometallic salts, organic metal salts, inorganic metal salts and from the group consisting of charged or uncharged metal-containing coordination compounds, in particular metal chelate complexes. The expression "metal-organic or organometallic compounds" in the context of this invention especially encompasses the use of metal compounds having a direct carbon-metal bond, also referred to here as metal organyls (e.g. tin organyls) or organometallic compounds (e.g. organotin compounds). The expression "organometallic or metal-organic salts" in the context of this invention especially encompasses the use of metal-organic or organometallic compounds having salt character, i.e. ionic compounds in which either the anion or cation is metal-organic in nature (e.g. organotin oxides, organotin chlorides or organotin carboxylates). The expression "organic metal salts" in the context of this invention especially encompasses the use of metal compounds which do not have any direct carbon-metal bond and are simultaneously metal salts, in which either the anion or the cation is an organic compound (e.g. tin(II) carboxylates). The expression "inorganic metal salts" in the context of this invention especially encompasses the use of metal compounds or of metal salts in which neither the anion nor the cation is an organic compound, e.g. metal chlorides (e.g. tin(II) chloride), pure metal oxides (e.g. tin oxides) or mixed metal oxides, i.e. containing a plurality of metals, and/or metal silicates or aluminosilicates. The expression "coordination compound" in the context of this invention especially encompasses the use of metal compounds formed from one or more central particles and one or more ligands, the central particles being charged or uncharged metals (e.g. metal- or tin-amine complexes). The expression "metal-chelate complexes" in the context of this invention especially encompasses the use of metal coordination compounds which have ligands having at least two coordination or bonding positions to the metal centre (e.g. metal- or tin-polyamine or metal- or tin-polyether complexes). Suitable metal compounds, especially as defined above, as catalysts in the sense of the present invention may be selected, for example, from all metal compounds comprising lithium, sodium, potassium, magnesium, calcium, scandium, yttrium, titanium, zirconium, vanadium, niobium, chromium, molybdenum, tungsten, manganese, cobalt, nickel, copper, zinc, mercury, aluminium, gallium, indium, germanium, tin, lead, and/or bismuth, especially sodium, potassium, magnesium, calcium, titanium, zirconium, molybdenum, tungsten, zinc, aluminium, tin and/or bismuth, more preferably tin, bismuth, zinc and/or potassium.

Suitable metal-containing coordination compounds include, for example, any metal acetylacetonates such as nickel(II) acetylacetonate, zinc(II) acetylacetonate, copper (II) acetylacetonate, molybdenum dioxoacetylacetonate, any iron acetylacetonates, any cobalt acetylacetonates, any zirconium acetylacetonates, any titanium acetylacetonates, any bismuth acetylacetonates and any tin acetylacetonates. Particularly suitable metal-organic salts and organic metal salts, particularly as defined above, as catalysts in the context of the present invention, are, for example, organotin, tin, zinc, bismuth and potassium salts, especially corresponding metal carboxylates, alkoxides, thiolates and mercaptoacetates, for example dibutyltin diacetate, dimethyltin dilaurate, dibutyltin dilaurate (DBTDL), dioctyltin dilaurate (DOTDL), dimethyltin dineodecanoate, dibutyltin dineodecanoate, dioctyltin dineodecanoate, dibutyltin dioleate, dibutyltin bis-n-laurylmercaptide, dimethyltin bis-n-laurylmercaptide, monomethyltin tris-2-ethylhexylmercaptoacetate, dimethyltin bis-2-ethylhexylmercaptoacetate, dibutyltin bis-2-ethylhexylmercaptoacetate, dioctyltin bisisooctylmercaptoacetate, tin(II) acetate, tin(II) 2-ethylhexanoate (tin(II) octoate), tin(II) isononanoate (tin(II) 3,5,5-trimethylhexanoate), tin(II) neodecanoate, tin(II) ricinoleate, zinc(II) acetate, zinc(II) 2-ethylhexanoate (zinc(II) octoate), zinc(II) isononanoate (zinc(II) 3,5,5-trimethylhexanoate), zinc(II) neodecanoate, zinc(II) ricinoleate, bismuth acetate, bismuth 2-ethylhexanoate, bismuth octoate, bismuth isononanoate, bismuth neodecanoate, potassium formate, potassium acetate, potassium 2-ethylhexanoate (potassium octoate), potassium isononanoate, potassium neodecanoate and/or potassium ricinoleate. Suitable metallic catalysts are generally selected with preference such that they do not have any inherent nuisance odor, are substantially unobjectionable toxicologically, and endow the resultant polyurethane systems, especially polyurethane foams, with as low a level of catalyst-induced emissions as possible.

Aside from amines and metal compounds, it is also possible to use ammonium salts as catalysts. Suitable examples are ammonium formate and/or ammonium acetate.

Suitable catalysts are mentioned, for example, in DE 102007046860, EP 1985642, EP 1985644, EP 1977825, US 2008/0234402, EP 0656382 B1 and US 2007/0282026 A1, and the patent documents cited therein.

Suitable use amounts of catalysts are guided by the type of catalyst and are preferably in the range from 0.01 to 10.0 pphp, more preferably in the range from 0.02 to 5.00 pphp (=parts by weight based on 100 parts by weight of polyol).

Optional additives used may be all substances which are known according to the prior art and find use in the production of polyurethanes, especially of hot-cure flexible PU foams, for example blowing agents, preferably water for formation of $CO_2$, and, if necessary, further physical blowing agents, crosslinkers and chain extenders, stabilizers against oxidative degradation (called antioxidants), flame retardants, surfactants, biocides, cell-refining additives, cell openers, solid fillers, antistatic additives, nucleating agents, thickeners, dyes, pigments, color pastes, fragrances, emulsifiers, buffer substances and/or catalytically active substances, especially as defined above.

Water is generally used as the blowing agent in the production of hot-cure flexible PU foams. Preference is given to using such an amount of water that the water concentration is from 0.10 to 10.0 pphp (pphp=parts by weight based on 100 parts by weight of polyol).

It is also possible to use suitable physical blowing agents. These are, for example, liquefied $CO_2$ and volatile liquids, for example hydrocarbons having 3, 4 or 5 carbon atoms, preferably cyclopentane, isopentane and n-pentane, oxygen-containing compounds such as methyl formate, acetone and dimethoxymethane, or chlorinated hydrocarbons, preferably dichloromethane and 1,2-dichloroethane.

Apart from water and the physical blowing agents, it is also possible to use other chemical blowing agents which react with isocyanates to evolve a gas, for example formic acid.

Optional crosslinkers and optional chain extenders are low molecular weight, polyfunctional compounds which are reactive toward isocyanates. Suitable compounds are, for example, hydroxyl- or amine-terminated substances such as glycerol, neopentyl glycol, 2-methyl-1,3-propanediol, triethanolamine (TEOA), diethanolamine (DEOA) and trimethylolpropane. The use concentration is usually in the range from 0.1 to 5 parts, based on 100 parts of polyol, but can also deviate therefrom depending on the formulation.

Suitable optional stabilizers against oxidative degradation, so-called antioxidants, preferably include all commonly used free-radical scavengers, peroxide scavengers, UV absorbers, light stabilizers, complexing agents for metal ion contaminants (metal deactivators). Preference is given to using compounds of the following classes of substances, or classes of substances containing the following functional groups, with substituents on the respective parent molecules preferably being, in particular, substituents which have groups which are reactive toward isocyanate: 2-(2'-hydroxyphenyl)benzotriazoles, 2-hydroxybenzophenones, benzoic acids and benzoates, phenols, in particular comprising tert-butyl and/or methyl substituents on the aromatic entity, benzofuranones, diarylamines, triazines, 2,2,6,6-tetramethylpiperidines, hydroxylamines, alkyl and aryl phosphites, sulfides, zinc carboxylates, diketones.

Suitable optional flame retardants in the context of this invention are all substances which are regarded as suitable for this purpose according to the prior art. Preferred flame retardants are, for example, liquid organophosphorus compounds such as halogen-free organophosphates, e.g. triethyl phosphate (TEP), halogenated phosphates, for example tris (1-chloro-2-propyl) phosphate (TCPP) and tris(2-chloroethyl) phosphate (TCEP), and organic phosphonates, for example dimethyl methanephosphonate (DMMP), dimethyl propanephosphonate (DMPP), or solids such as ammonium polyphosphate (APP) and red phosphorus. Suitable flame retardants further include halogenated compounds, for example halogenated polyols, and also solids such as expandable graphite and melamine.

For stabilization of the rising foam mixture and for influencing of the foam properties of polyurethane foams, organomodified siloxanes are usually used in the production of hot-cure flexible PU foams. (Organomodified) siloxanes suitable for this purpose are described for example in the following documents: EP 0839852, EP 1544235, DE 102004001408, EP 0839852, WO 2005/118668, US 20070072951, DE 2533074, EP 1537159, EP 533202, U.S. Pat. No. 3,933,695, EP 0780414, DE 4239054, DE 4229402, EP 867465. These compounds may be prepared as described in the prior art. Suitable examples are described, for instance, in U.S. Pat. No. 4,147,847, EP 0493836 and U.S. Pat. No. 4,855,379. Foam stabilizers for hot-cure flexible PU foams are characterized by large siloxane structures having more than 50 Si units and pendant polyethers. These foam stabilizers are also referred to as polydialkylsiloxane-polyoxyalkylene copolymers. The structure of these compounds is preferably such that, for example, a long-chain copolymer of ethylene oxide and propylene oxide is bonded to a polydimethylsiloxane radical. The linkage between the polydialkylsiloxane and the polyether moiety may be via an SiC linkage or an Si—O—C bond. In structural terms, the polyether or the different polyethers may be bonded to the polydialkylsiloxane in terminal or lateral positions. The alkyl radical of the siloxane may be aliphatic, cycloaliphatic or aromatic. Methyl groups are very particularly advantageous. The organomodified polydialkylsiloxane may be linear or else contain branches. Suitable stabilizers, especially foam stabilizers, are described inter alia in U.S. Pat. Nos. 2,834,748, 2,917,480 and in U.S. Pat. No. 3,629,308. The function of the foam stabilizer is to assure the stability of the foaming reaction mixture. The contribution to foam stabilization correlates here with siloxane chain length. Without foam stabilizer, a collapse is observed, and hence no homogeneous foam is obtained. In the case of some flexible PU foam types not according to the invention that have higher stability and hence a lower tendency to collapse, it is also possible to use low molecular weight polyethersiloxanes. These then have siloxane chain lengths much shorter than 50. For instance, in the case of cold-cure flexible PU foams or ester foams, unmodified or modified short-chain siloxanes are used. When long-chain and hence more potent siloxane stabilizers are used, by contrast, over-stabilization and hence shrinkage after foam production is observed in such foam types.

Foam stabilizers may in principle be selected as desired in the context of the present invention, provided that combinations of compounds of the formulae (1a) and (1b) are used in accordance with the invention in hot-cure flexible PU foam. As already elucidated, these especially serve to improve the dimensional stability of the foam bodies after compression, especially after roll compression.

The compounds of formulae (1a) and (1b) can, for example, be used together with suitable solvents and/or further additives. As optional solvents, it is possible to employ all suitable substances known from the prior art. Depending on the application, it is possible to use aprotic nonpolar, aprotic polar and protic solvents. Suitable aprotic nonpolar solvents can, for example, be selected from the following classes of substances, or classes of substances containing the following functional groups: aromatic hydrocarbons, aliphatic hydrocarbons (alkanes (paraffins) and olefins), carboxylic esters (e.g. isopropyl myristate, propylene glycol dioleate, decyl cocoate or other esters of fatty acids) and polyesters, (poly)ethers and/or halogenated hydrocarbons having a low polarity. Suitable aprotic polar solvents can, for example, be selected from the following classes of substances, or classes of substances containing the following functional groups: ketones, lactones, lactams, nitriles, carboxamides, sulfoxides and/or sulfones. Suitable protic solvents can, for example, be selected from the following classes of substances, or classes of substances containing the following functional groups: alcohols, polyols, (poly)alkylene glycols, amines, carboxylic acids, in particular fatty acids and/or primary and secondary amides. Particular preference is given to solvents which are readily employable in the foaming operation and do not adversely affect the properties of the foam. For example, isocyanate-reactive compounds are suitable, since they are incorporated into the polymer matrix by reaction and do not generate any emissions in the foam. Examples are OH-functional compounds such as (poly)alkylene glycols, preferably monoethylene glycol (MEG or EG), diethylene glycol (DEG), triethylene glycol (TEG), 1,2-propylene glycol (PG), dipropylene glycol (DPG), trimethylene glycol (propane-1, 3-diol, PDO), tetramethylene glycol (butanediol, BDO), butyl diglycol (BDG), neopentyl glycol, 2-methylpropane-1,3-diol (Ortegol CXT) and higher homologues thereof, for example polyethylene glycol (PEG) having average molecular masses between 200 g/mol and 3000 g/mol. Particularly preferred OH-functional compounds further include polyethers having average molecular masses of 200 g/mol to 4500 g/mol, especially 400 g/mol to 2000 g/mol, among these preferably water-, allyl-, butyl- or nonyl-initiated polyethers, in particular those which are based on propylene oxide (PO) and/or ethylene oxide (EO) blocks.

When the compounds of formulae (1a) and (1b) are used in accordance with the invention, or premixed silicone combinations of the compounds having the formulae (1a) and (1b) with additional carriers are used in dissolved form or in combination with a solvent, the mass ratio of the sum total of all silicone components to solvent is by preference from 0.1:1 to 9:1, preferably from 0.25:1 to 5:1 and more preferably from 0.5:1 to 4:1.

The two siloxane components—namely compounds of the formulae (1a) and (1b)—may, in preferred embodiments of the invention, each be added separately to the foam mixture in pure form or blended with solvents, or else mixed with one another before addition.

Preferably, a sufficient amount of compounds having the formula (1a) may be added to a composition for production of hot-cure flexible PU foams that the proportion by mass thereof in the finished polyurethane foam is from 0.1% to 5% by weight, preferably from 0.25 to 3.0% by weight, more preferably from 0.5% to 2.0% by weight. The compound of formula (1b) is preferably used in a proportion by mass in the finished polyurethane foam of 0.1% to 5% by weight, preferably of 0.1% to 2.0% by weight, more preferably 0.1% to 1.5% by weight.

It can be advantageous in the production of the hot-cure flexible PU foam to produce and/or use a composition which comprises at least the inventive compounds of the formulae (1a) and (1b), at least one polyol component, optionally at least one isocyanate component and optionally one or more blowing agents and to react this composition.

It is preferable when the compounds of the formulae (1a) and (1b) are each used in a total amount corresponding to a mass fraction of 0.1 to 5.0 parts (pphp), preferably 0.1 to 3.0 parts and more preferably 0.3 to 2.0 parts, based on 100 parts (pphp) of polyol component.

The hot-cure flexible PU foams according to the invention can be produced by any methods familiar to the person skilled in the art, for example by manual mixing or preferably with the aid of foaming machines, especially low-pressure or high-pressure foaming machines. Batch processes or continuous processes may be used here.

It is possible to use any methods known to the person skilled in the art for production of hot-cure flexible PU foams. For example, the foaming operation can be effected either in the horizontal or in the vertical direction, in batchwise plants or continuous plants. The compositions used in accordance with the invention may similarly be used for $CO_2$ technology. Use in low-pressure and high-pressure machines is possible, with the compositions to be processed being able to be metered directly into the mixing chamber or be admixed even before the mixing chamber with one of the components which then go into the mixing chamber. Admixture in the raw material tank is also possible.

A very particularly preferred hot-cure flexible PU foam for the purpose of the present invention especially has the following composition:

TABLE 1

| Component | Parts by weight (pphp) |
| --- | --- |
| Polyol | 100 |
| Water | 0 to <10, preferably from 0.5 to 6 |
| (Amine) catalyst | 0.05 to 5 |
| Tin catalyst | 0 to 5, preferably from 0.01 to 2 |
| Compounds of the formula (1a) | 0.1 to 5, preferably 0.1 to 3 |
| Compounds of the formula (1b) | 0.1 to 5, preferably 0.1 to 3 |
| Physical blowing agent | 0 to 130 |
| Flame retardant | 0 to 70 |
| Fillers | 0 to 150 |
| Further additives | 0 to 20 |
| Isocyanate index: | greater than 75 and less than 130 |

The present invention further provides for the use of a combination of at least one compound of formula (1a) and at least one compound of formula (1b), with (1a) and (1b) each as defined further up, in the production of shaped hot-cure flexible PU foam articles, wherein the shaped hot-cure flexible PU foam article has been obtained by reaction of at least one polyol component and at least one isocyanate component in the presence of at least one blowing agent, to provide shaped hot-cure flexible PU foam articles having improved dimensional recovery after compression over a period of at least 20 hours.

The present invention further provides for the use of a combination of at least one compound of formula (1a) and at least one compound of formula (1b), with (1a) and (1b) each as defined further up, for improving the dimensional recovery of shaped hot-cure flexible PU foam articles after compression thereof over a period of at least 20 hours, wherein the shaped hot-cure flexible PU foam article is obtainable by reaction of at least one polyol component and at least one isocyanate component in the presence of at least one blowing agent in the presence of at least one compound of formula (1a) and at least one compound of formula (1b).

The present invention further provides for the use of flexible hot-cure PU foam in mattresses and/or cushions, in particular mattresses, wherein the flexible hot-cure PU foam has been obtained by reaction of at least one polyol component and at least one isocyanate component in the presence of at least one compound of formula (1a) and at least one compound of formula (1b), with (1a) and (1b) each as defined further up. In this respect, reference may be made, in particular, to what has been said above, which is also applicable to this subject matter.

The use according to the invention enables the provision of mattresses and/or cushions having improved dimensional recovery after compression over a period of at least 20 hours. The use according to the invention allows for improved dimensional recovery of mattresses and/or cushions after compression thereof over a period of at least 20 hours.

The invention further provides a process for storing and/or for transporting shaped PU foam articles, preferably mattresses and/or cushions, wherein
   (a) in a first step a shaped hot-cure flexible PU foam article is provided by reaction of at least one polyol component and at least one isocyanate component in the presence of at least one compound of formula (1a) and at least one compound of formula (1b), with (1a) and (1b) each as defined further up, and of at least one blowing agent and at least one catalyst,
   (b) in optional subsequent steps the hot-cure flexible PU foam obtained may optionally be subjected to further processing to prepare it for the application,
   (c) and wherein in a final step the shaped hot-cure flexible PU foam article (optionally prepared for the application) is compressed by at least 20%, preferably at least 30%, in particular at least 40%, based on its starting volume, and optionally vacuum-packed and kept in compressed form by auxiliary means, in particular packaging means, and sent for storage and/or transport.

The invention further provides a process for producing hot-cure flexible polyurethane foam having a porosity of 1 to 6 scfm, preferably 1.5 to 4.5 scfm, especially 1.75 to 4.25 scfm, by reaction of at least one polyol component and at least one isocyanate component in the presence of at least one compound of formula (1a) and at least one compound of formula (1b) and at least one blowing agent and at least one catalyst, with formulae (1a) and (1b) each as defined further up, especially with additional use of recycled polyols.

The invention further provides a mixture comprising at least one compound of formula (1a) and at least one compound of formula (1b), with (1a) and (1b) each as defined above, and/or glycols, polyethers, organic esters and/or other solvents suitable for the purposes of hot-cure flexible PU foam production.

EXAMPLES

Physical Properties of the Flexible PU Foams:

The flexible PU foams produced were assessed according to the following physical properties a) to g):

a) Rise time: The period of time between the end of mixing of the reaction components and the blow-off of the polyurethane foam.

b) Rise height or foam height: the height of the free-risen foam formed after 3 minutes. Foam height is reported in centimetres (cm).

c) Settling of the foam at the end of the rise phase (=fallback): The settling is found from the difference of the foam height after direct blow-off and 3 minutes after foam blow-off. The foam height is measured at the maximum in the middle of the foam crest by means of a needle secured to a centimetre scale. A negative value here describes settling of the foam after blow-off, a positive value correspondingly describes further rise of the foam.

g) Number of cells per cm (cell count): This is determined visually on a cut surface (measured to DIN EN 15702).

e) Foam density (FD): Determined as described in ASTM D 3574-11 under Test A by measuring the core density. Foam density is reported in kg/m$^3$.

f) Porosity determined by the flow method: In the airflow method in accordance with ASTM D 3574 (2011-00), the volume of air that flows through a defined foam specimen in a particular period of time on application of a pressure differential is determined. For this purpose, 12 test specimens having dimensions of 5 cm×5 cm×2.5 cm were cut out of each of the finished foams transverse to the direction of rise of the foam, and successively inserted into an analytical instrument constructed for this method. The construction of this instrument is described in ASTM D 3574 (2011-00). The analytical instrument generates an air pressure differential of 125 Pa between the inside of the instrument and the surrounding atmosphere by sucking just enough air in through the test specimen for the differential to be kept constant. The air flow through the test specimen is thus a measure of the porosity of the foam. Values in the range from 0-6.5 scfm (standard cubic feet per min) were measured, with lower values within the interval characterizing a more closed foam and higher values a more open foam.

g) Result of the rolling test This specific test is described in detail further down.

For the sake of completeness, the measurement principle of DIN EN ISO 16000-9:2008-04 is also elucidated hereinafter.

The materials are characterized here with regard to the type and the amount of the organic substances outgassable therefrom. The analysis method serves to ascertain emissions from materials that are used in furniture and mattresses. This is done by using test chambers to measure the emissions.

Analysis

Test Specimen: Sample Preparation, Sampling and Specimen Dimensions

The reaction mixture is introduced into a PE plastic bag which is open at the top. After the foam has risen and blown off, the PE bag is closed 3 min after the blow-off. The foam is stored in this way at room temperature for 12 hours in order to enable complete reaction, but simultaneously in order to prevent premature escape of VOCs. Subsequently, the PE bag is opened and a 7 cm×7 cm×7 cm cube is taken from the centre of the foam block and immediately wrapped in aluminium foil and sealed airtight in a PE bag. It was then transported to the analytical laboratory, and the foam cube was introduced into a cleaned 30 l glass test chamber. The conditions in the test chamber were controlled climatic conditions (temperature 21° C., air humidity 50%). Half the volume of the test chamber is exchanged per hour. After 24 hours, samples are taken from the test chamber air. Tenax adsorption tubes serve to absorb the VOCs. The Tenax tube is then heated, and the volatile substances released are cryofocused in a cold trap of a temperature-programmable evaporator with the aid of an inert gas stream. After the heating phase has ended, the cold trap is rapidly heated to 280° C. The focused substances vaporize in the process. They are subsequently separated in the gas chromatography separation column and detected by mass spectrometry. Calibration with reference substances permits a semi-quantitative estimate of the emission, expressed in "$\mu g/m^3$". The quantitative reference substance used for the VOC analysis (VOC value) is toluene. Signal peaks can be assigned to substances using their mass spectra and retention indices. The following equipment is used for the analysis: Gerstel, D-45473 Mühlheim an der Ruhr, Eberhard-Gerstel-Platz 1, TDS-3/KAS-4, Tenax® desorption tubes, Agilent Technologies 7890A (GC)/5975C (MS), column: HP Ultra2 (50 m, 0.32 mm, 0.52 μm), carrier gas: helium. More specific procedural instructions can be taken from DIN EN ISO 16000-9:2008-04.

Described below is the rolling deformation test which makes it possible to test dimensional recovery after compression in the context of the present invention.

Rolling Deformation Test ("Rolling Test" for Short)

Objective:

The test has for its object to simulate the conditions of rolled mattresses in the laboratory. Since there is no meaningful industry standard for this a novel test was developed which simulates the rolling-up of mattress foams on a small scale.

Sample Preparation:

Test specimens having dimensions of 12 cm (width), 16 cm (length) and 2.5 cm (thickness) are cut out of the flexible PU foam blocks as obtained from manual foaming for example, using a band saw. A central position in the foam blocks from manual foaming is selected. The test specimen is cut out such that the rise direction of the foam during production is at right angles to the length and width of the test specimen. Test specimens are marked with a felt pen.

Test Procedure:

The test specimen is compressed with a thin metal rod of diameter 5-8 mm (e.g. metal ballpoint pen) at a 12 cm edge. The foam test specimen is then rolled up around this metal rod by hand. This significantly compresses the foam, forming a roll having a diameter of about 3-4 cm. This roll is held manually in this compressed state and pushed completely into a cardboard tube. The cardboard tube has an internal diameter of 4 cm and a length of at least 13 cm. As soon as the rolled-up foam is fully inserted in the tube the metal rod is removed. To minimize friction during removal the metal rod may be lightly greased before the rolling of the foam. The foam then fills the volume of the tube. The compression of the foam in the centre is much more severe than at the edge of the tube. The roll is then stored under controlled, constant conditions (temperature: 21° C., atmospheric humidity: 60%) for 7 days. After 168 hours the foam is manually removed from the tube and placed on an even surface, and the unrolling of the foam is observed. The expansion of the foam must not be disturbed or influenced.

Evaluation:

The shaped flexible PU foam article is left to expand for 10 minutes. The test specimens are then evaluated. The most important criterion is whether the foam has completely recovered its original thickness or—especially at the more severely compressed edge—still has compression zones. In some cases a groove from the compression is still also apparent on the surface of the test specimen. Very poor test specimens remain rolled up at one end. A slight bend in the test specimen after expansion is normal and is not considered in the assessment. The following grades were used for the evaluation:

+++: Test specimen has fully unrolled, no compression lines or compressions apparent whatsoever, expansion occurs rapidly and is already complete after 5 min.

++: The test specimen has regained a thickness of 2.5 cm at all sites. No indentations and grooves remain visible at the surface after 10 minutes (particularly at the more severely compressed end).

+: The test specimen has regained a thickness of 2.5 cm at all sites. However, slight indentations and grooves remain visible at the surface (particularly at the more severely compressed end).

0: The test specimen exhibits a slight compression at the more severely compressed end. The thickness there is more than 2.0 cm but less than 2.5 cm. An indentation is clearly visible at this end.

−: Test specimen exhibits a slight compression at the more severely compressed end. The thickness of the sample there is more than 1 cm but still markedly less than 2.0 cm.

−−: Test specimen exhibits a severe compression at the more severely compressed end. The thickness of the sample there is less than 1 cm. The sample is still partly rolled up at this end.

−−−: Test specimen remains rolled up and compressed at the more severely compressed end. The evaluation is preferably undertaken by at least two people. The results are documented. In the context of the present invention the evaluation was undertaken by four people who arrived at consistent results.

Deficiencies and constraints of the test: Correct dimensions of the test specimen and uniform rolling must be ensured in the test. The foam test specimen must have constant cell structure parameters, i.e. in particular a constant cell size and a constant air permeability. The metal rod must not be excessively greased so that no grease penetrates into the sample. Constant storage conditions must be maintained. Test specimens given the various evaluation grades must be kept available for comparison.

Precision of the Test:

Performance of the test with two or more people for evaluation regularly results in consistent assessments. In duplicate measurements too the same result was regularly confirmed. The test has thus proven reliable.

Hot-Cure Flexible PU Foam—Foaming Examples

Example 1: Production of Hot-Cure Flexible PU Foams (Flexible Slabstock Foam)

For the performance testing of the inventive compounds of the formulae (1a) and (1b), the hot-cure flexible PU foam formulation specified in Table 2 was used.

TABLE 2

Formulation 1 for hot-cure flexible PU foam production.

| Formulation 1 | Parts by mass (pphp) |
|---|---|
| Polyol 1[1)] | 100 parts |
| water | 4.00 parts |
| Tin catalyst[2)] | 0.20-0.28 part |
| TEGOAMIN ® DMEA[3)] | 0.15 part |
| FOAM STABILIZER 1[4)] | 0.40 or 0.45 part |
| Optionally silicone additives[5)]) | 1.0 part |
| Desmodur ® T 80[6)] | 50.0 part |

[1)]Polyol 1: Voranol ® CP 3322 available from Dow Chemical, this is a glycerol-based polyether polyol having an OH number of 48 mg KOH/g and predominantly secondary OH groups, average molar mass = 3500 g/mol.
[2)]KOSMOS ® 29, available from Evonik Industries: tin(II) salt of 2-ethylhexanoic acid.
[3)]TEGOAMIN ® DMEA: dimethylethanolamine, available from Evonik Industries. Amine catalyst for production of polyurethane foams.
[4)]Polyether-modified polysiloxane of the following structure:

Foam Stabilizer 1 (Corresponds to Compound of the Formula 1a):

Polyethersiloxane of the following structure:

where
a=2
b=70
c=4
d=0
e=0
with:
a+b+c+d+e=76
$R^1$=Me
$R^2$=identical or different polyethers of the general formula (e), obtainable from the polymerization of ethylene oxide and propylene oxide, Formula (e):

with:
37.5 mol % of polyether 1 in which
f=3
g=37
h=38
where
g+h=75, statistical structure
$R^3$=methyl
and
62.5 mol % of polyether 2 in which
f=3
g=14
h=0
where
g+h=14, statistical structure
$R^3$=methyl.

In the inventive experiments, short-chain siloxane components were added to a hot-cure flexible PU foam formulation containing a high molecular weight silicone component (of formula 1a) as foam stabilizer. The 3 selected silicone additives (each corresponding to compounds of the formula 1b) are characterized as follows:

[5)] Silicone Additive 1
Unmodified silicone oil of the following composition:

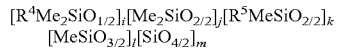

where
i=2
j=distribution 2 to 15, maximum at 9
k=0
l=0
m=0
with:
i+j+k+l+m=distribution 4 to 17, maximum at 11
$R^4$=Me Silicone Additive 2
Polyether-modified siloxane having the following structure parameters:

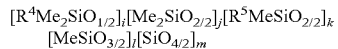

where
i=2
j=4.0
k=2.0
l=0
m=0
with:
i+j+k+l+m=8
$R^4$=Me
$R^5$=polyether 1 of formula f:

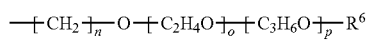

where:
n=3
o=3.5
p=2.0
where
o+p=5.5
$R^6$=OH

Silicone Additive 3
Heptamethyltrisiloxane modified with n-octene. Structure parameters as follows:

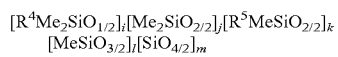

where
i=2
j=0
k=1
l=0
m=0
where:
i+j+k+l+m=3
$R^4$=Me
$R^5$=n-octyl

[6)] tolylene diisocyanate T 80 (80% 2,4 isomer, 20% 2,6 isomer) from Covestro, 3 mPa·s, 48% NCO, functionality 2.

400 g of polyol was used in each foaming operation; the other formulation constituents were recalculated accordingly. 1.00 part of a component denoted 1.00 g of this substance per 100 g of polyol for example.

The foaming was carried out by what is called manual mixing. Formulation 1 as specified in table 2 was used. To this end, a paper cup was charged with polyol, the respective amine catalyst mixture, the tin catalyst tin(ll) 2-ethylhexanoate, water, foam stabilizer and optionally an additional low molecular weight silicon additive (compounds of the formula (1b)), and the contents were mixed at 1000 rpm for 60 seconds with a disc stirrer. After the first stirring the isocyanate (TDI) was added to the reaction mixture and stirred at 2500 rpm for 7 s and then immediately transferred into a paper-lined box (30 cm×30 cm base area and 30 cm height). After being poured in, the foam rose up in the foaming box. In the ideal case, the foam blew off on attainment of the maximum rise height and then fell back slightly. This opened the cell membranes of the foam bubbles and an open-pore cell structure of the foam was obtained. To assess the properties, the following characteristic parameters were determined: rise time, rise height and fallback of the foam after the end of the rise phase (=settling).

Defined foam bodies were cut out of the resulting hot-cure flexible PU foam blocks and were analysed further. The following physical properties were determined on the test specimens: cell count, porosity by the flow method, foam density (FD) and rolling deformation at room temperature.

The results of the influence of the compounds according to the invention with regard to foaming and the physical properties of the resulting hot-cure flexible PU foams are compiled in the tables that follow. By way of comparison, firstly hot-cure flexible PU foams were produced with solely a standard flexible foam stabilizer (foam stabilizer 1) and solely with the silicone additives silicone additive 1, silicone additive 2 and silicone additive 3. The foams without foam stabilizer all collapsed, and no meaningfully evaluable foam was obtained. According to the invention, combinations of foam stabilizer 1 and the silicone additives 1, 2 and 3 were then used.

TABLE 3

|  | Reference (foam stabilizer 1 only) (non-inventive) | Reference (foam stabilizer 1 only) (non-inventive) | Reference (foam stabilizer 1 only) (non-inventive) | Reference (foam stabilizer 1 only) (non-inventive) | Reference (foam stabilizer 1 only) (non-inventive) | Reference (foam stabilizer 1 only) (non-inventive) |
|---|---|---|---|---|---|---|
| Amount of Sn catalyst | 0.22 | 0.22 | 0.22 | 0.22 | 0.22 | 0.20 |
| Stabilizer | 0.45 part foam stabilizer 1 | 0.40 part foam stabilizer 1 | 0.45 part foam stabilizer 1 | 0.40 part foam stabilizer 1 | 0.45 part foam stabilizer 1 | 0.45 part foam stabilizer 1 |

TABLE 3-continued

|  | Reference (foam stabilizer 1 only) (non-inventive) | Reference (foam stabilizer 1 only) (non-inventive) | Reference (foam stabilizer 1 only) (non-inventive) | Reference (foam stabilizer 1 only) (non-inventive) | Reference (foam stabilizer 1 only) (non-inventive) | Reference (foam stabilizer 1 only) (non-inventive) |
|---|---|---|---|---|---|---|
| Additive | — | — | — | — | — | — |
| a) Rise time (s) | 94 | 94 | 99 | 99 | 98 | 105 |
| b) Rise height (cm) | 31.8 | 31.3 | 29.5 | 30.1 | 29.4 | 26.6 |
| c) Settling (cm) | −0.3 | −0.5 | −0.1 | −0.1 | −0.1 | −0.1 |
| d) Cell count (per cm) | 14 | 14 | 13 | 14 | 14 | 13 |
| e) Density (kg/m$^3$) | 24.4 | 24.4 | 25.1 | 24.8 | 24.8 | 27.1 |
| f) Porosity (SCFM) | 2.12 | 1.86 | 2.23 | 3.64 | 3.23 | 4.79 |
| g) Rolling deformation (7 d, 21° C.) | − − − | − − − | − − − | − | 0 | + + + + |

TABLE 4

|  | Additive only (non-inventive) | Additive only (non-inventive) | Foam stabilizer 1 + silicone additive 1 (inventive) | Foam stabilizer 1 + silicone additive 1 (inventive) | Foam stabilizer 1 + silicone additive 1 (inventive) | Foam stabilizer 1 + silicone additive 1 (inventive) |
|---|---|---|---|---|---|---|
| Amount of Sn catalyst | 0.20 | 0.22 | 0.22 | 0.22 | 0.24 | 0.26 |
| Stabilizer | — | — | 0.45 part foam stabilizer 1 | 0.45 part foam stabilizer 1 | 0.45 part foam stabilizer 1 | 0.45 part foam stabilizer 1 |
| Additive | 1.0 part silicone additive 1 | 1.0 part silicone additive 1 | 1.0 part silicone additive 1 | 1.0 part silicone additive 1 | 1.0 part silicone additive 1 | 1.0 part silicone additive 1 |
| Rise time (s) | collapse | collapse | 96 | 87 | 91 | 89 |
| Rise height (cm) | collapse | collapse | 27.9 | 27.1 | 28.1 | 28.1 |
| Settling (cm) | collapse | collapse | −2.0 | −1.4 | −1.7 | −1.6 |
| Cells (per cm) | collapse | collapse | 14 | 14 | 14 | 14-15 |
| Density (kg/m$^3$) | collapse | collapse | 26.8 | 25.2 | 26.3 | 25.8 |
| Porosity (SCFM) | collapse | collapse | 3.79 | 2.46 | 2.58 | 1.85 |
| Roll deformation (7 d, 21° C.) | collapse | collapse | + + | + + | 0 | − |

TABLE 5

|  | Foam stabilizer 1 + silicone additive 1 (inventive) | Additive only (non-inventive) | Additive only (non-inventive) | Foam stabilizer 1 + silicone additive 2 (inventive) | Foam stabilizer 1 + silicone additive 2 (inventive) | Foam stabilizer 1 + silicone additive 2 (inventive) |
|---|---|---|---|---|---|---|
| Amount of Sn catalyst | 0.28 | 0.20 | 0.22 | 0.20 | 0.22 | 0.24 |
| Stabilizer | 0.45 part foam stabilizer 1 | — | — | 0.45 part foam stabilizer 1 | 0.45 part foam stabilizer 1 | 0.45 part foam stabilizer 1 |
| Additive [parts] | 1.0 part silicone additive 1 | 1.0 part silicone additive 2 | 1.0 part silicone additive 2 | 1.0 part silicone additive 2 | 1.0 part silicone additive 2 | 1.0 part silicone additive 2 |
| Rise time (s) | 85 | collapse | collapse | 107 | 102 | 98 |
| Rise height (cm) | 29.1 | collapse | collapse | 26.5 | 26.8 | 27.4 |
| Settling (cm) | −1.4 | collapse | collapse | −0.1 | 0.0 | −0.1 |
| Cells (per cm) | 14-15 | collapse | collapse | 13 | 13 | 13 |
| Density (kg/m$^3$) | 25.4 | collapse | collapse | 27.5 | 27.4 | 24.1 |
| Porosity (SCFM) | 0.99 | collapse | collapse | 4.99 | 4.42 | 3.77 |
| Rolling deformation (7 d, 21° C.) | − − − | collapse | collapse | + + + + | + + + + | + + + |

TABLE 6

|  | Foam stabilizer 1 + silicone additive 2 (inventive) | Foam stabilizer 1 + silicone additive 2 (inventive) | Foam stabilizer 1 + silicone additive 2 (inventive) | Additive only (non-inventive) | Additive only (non-inventive) | Foam stabilizer 1 + silicone additive 3 (inventive) | Foam stabilizer 1 + silicone additive 3 (inventive) | Foam stabilizer 1 + silicone additive 3 (inventive) |
|---|---|---|---|---|---|---|---|---|
| Amount of Sn catalyst | 0.26 | 0.22 | 0.28 | 0.20 | 0.22 | 0.20 | 0.22 | 0.24 |
| Stabilizer | 0.45 part foam stabilizer 1 | 0.45 part foam stabilizer 1 | 0.45 part foam stabilizer 1 | — | — | 0.45 part foam stabilizer 1 | 0.45 part foam stabilizer 1 | 0.45 part foam stabilizer 1 |
| Additive | 1.0 part silicone additive 2 | 1.0 part silicone additive 2 | 1.0 part silicone additive 2 | 1.0 part silicone additive 3 | 1.0 part silicone additive 3 | 1.0 part silicone additive 3 | 1.0 part silicone additive 3 | 1.0 part silicone additive 3 |
| Rise time (s) | 93 | 90 | 89 | collapse | collapse | 109 | 103 | 97 |
| Rise height (cm) | 27.2 | 28.6 | 27.7 | collapse | collapse | 27.1 | 27.6 | 27.8 |
| Settling (cm) | 0.0 | −0.1 | −0.2 | collapse | collapse | −0.1 | −0.1 | 0.0 |
| Cells (per cm) | 13 | 14 | 13 | collapse | collapse | 13 | 13 | 13 |
| Density (kg/m$^3$) | 27.0 | 24.3 | 26.3 | collapse | collapse | 28.1 | 27.6 | 26.7 |
| Porosity (SCFM) | 3.12 | 3.03 | 1.32 | collapse | collapse | 5.34 | 4.91 | 3.76 |
| Roll deformation (7 d, 21° C.) | + + + | + + | − − − | collapse | collapse | + + + + | + + + + | + + + |

TABLE 7

|  | Foam stabilizer 1 + silicone additive 3 (inventive) | Foam stabilizer 1 + silicone additive 3 (inventive) |
|---|---|---|
| Amount of Sn catalyst | 0.26 | 0.28 |
| Stabilizer | 0.45 part foam stabilizer 1 | 0.45 part foam stabilizer 1 |
| Additive | 1.0 part silicone additive 3 | 1.0 part silicone additive 3 |
| Rise time (s) | 92 | 88 |
| Rise height (cm) | 27.4 | 28.6 |
| Settling (cm) | 0.0 | −0.1 |
| Cells (per cm) | 13 | 13 |
| Density (kg/m$^3$) | 26.6 | 25.6 |
| Porosity (SCFM) | 2.21 | 1.32 |
| Rolling deformation (7 d, 21° C.) | ++ | −− |

In the evaluation of the results, it has to be taken into account that the result of the rolling test depends significantly on the porosity of the foam. Foams having a more closed cell structure are generally worse here than those having an open cell structure. Since porosity in foaming operations varies to a certain extent as a result of a wide variety of different influencing factors (temperatures, air pressure, etc.), the result of the rolling test must in each case be evaluated coupled with the porosity for a meaningful analysis.

Figure 1:
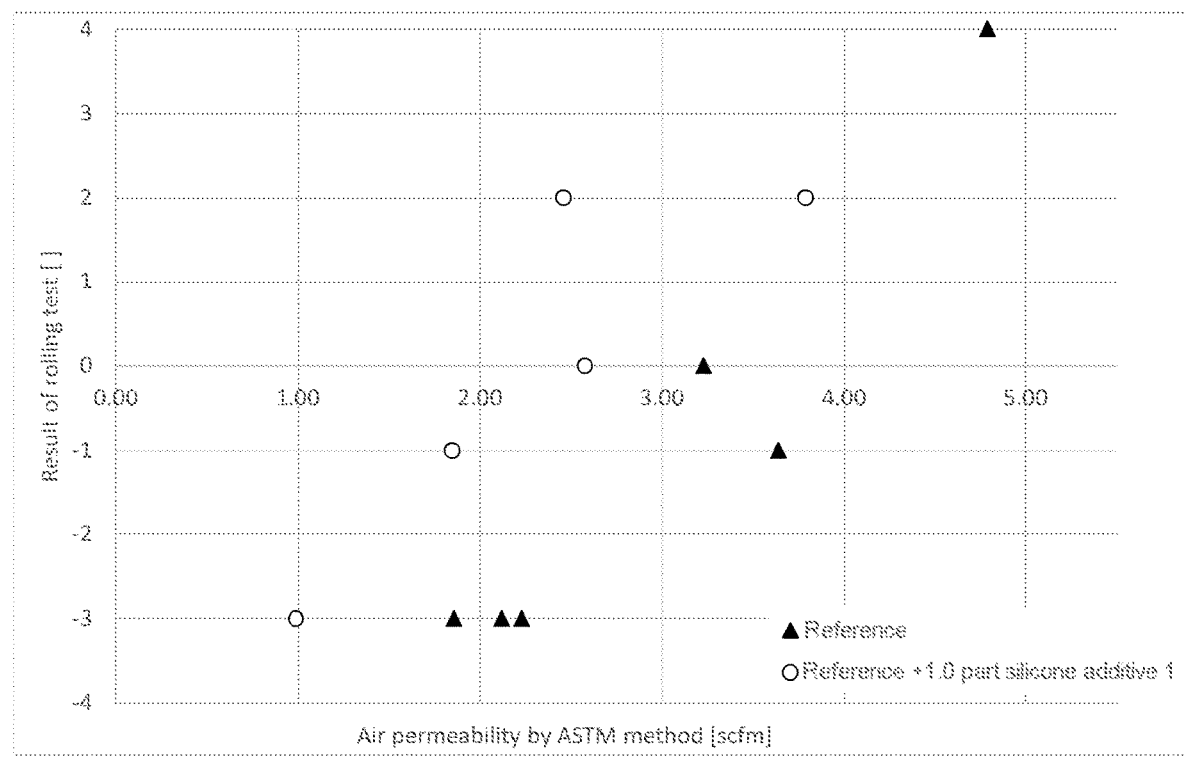
FIG. 1 the result of the rolling test for silicone additive 1 is plotted against the porosity.
Figure 2:
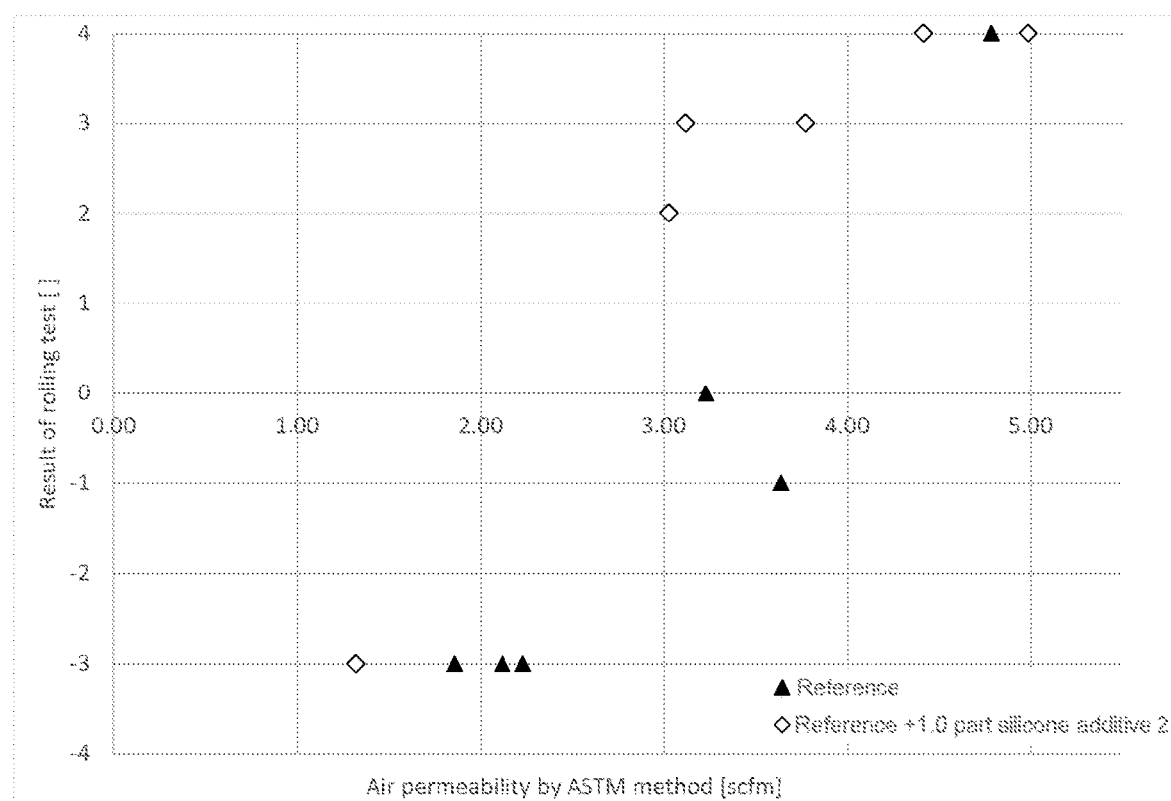
FIG. 2 the result of the rolling test for silicone additive 2 is plotted against the porosity.
Figure 3:
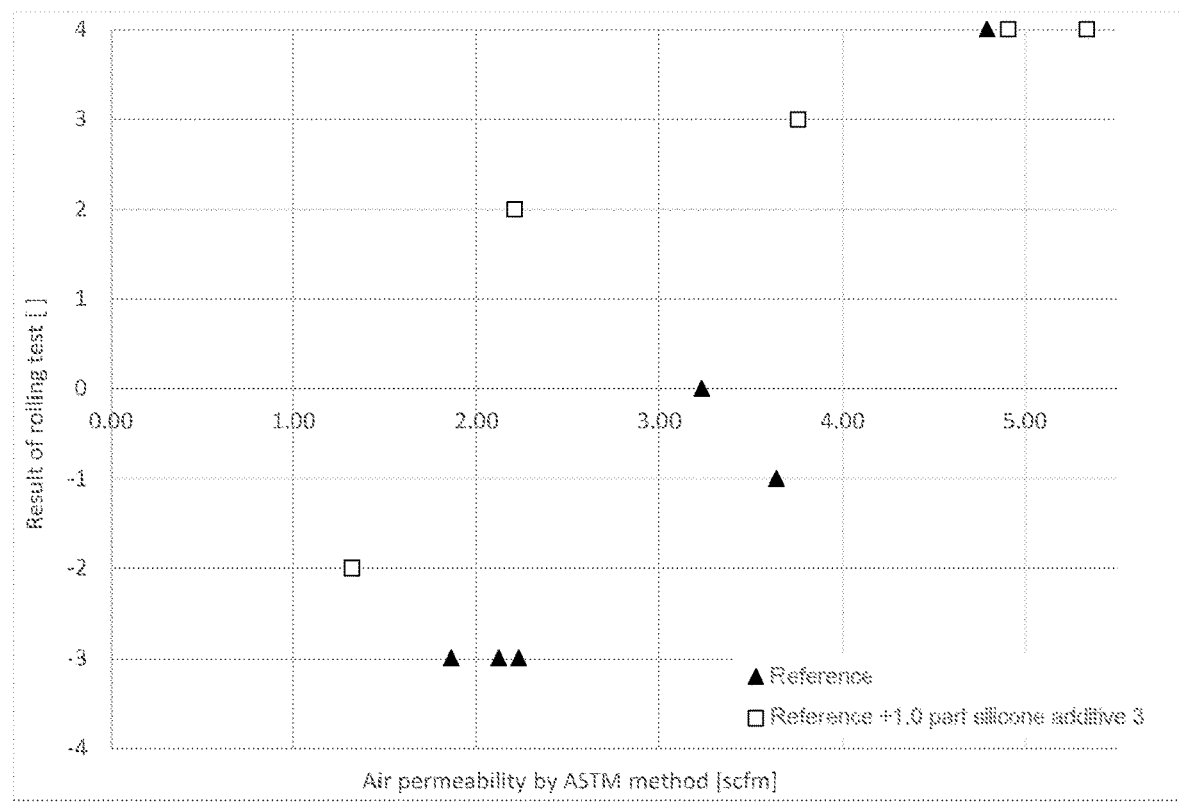
FIG. 3 the result of the rolling test for silicone additive 3 is plotted against the porosity.
For this purpose, in the figures FIG. 1 to FIG. 3, the result of the rolling test is plotted against porosity. In each case, the values for the reference (hot-cure flexible PU foam with foam stabilizer 1 only) and reference+1 part silicone additive are plotted. In order to obtain hot-cure flexible PU foams having different porosity, the same foaming operations were repeated on different days, the amount of stabilizer was varied and the amount of tin catalyst (Kosmos 29) was altered. Particularly the variation of the tin catalyst shows the desirably broad spectrum of porosity values.

It is found that significant dependence of the result of the rolling test on porosity is observed for the reference foams. Non-inventive foams having porosities up to 2.3 scfm are generally very poor in the rolling test. Conversely, non-inventive hot-cure flexible PU foams are very good in the rolling test when they are very open (scfm>4.5). Most of the industrial hot-cure flexible PU foams, however, are between 1.5 and 4.5 scfm. Within this range, significantly improved results have surprisingly been found for all foams according to the invention in the rolling test. There is generally a certain degree of scatter in the values since both the measurement of porosity and the measurement of the results of the rolling test are subject to variations. Nevertheless, a significant improvement can be discerned.

As can be seen, the inventive combination of a compound of formula (1a) with a compound of the formula (1b) shows significant advantages in the rolling deformation test on hot-cure flexible PU foams compared to the sole use of a single high molecular weight silicone component as foam stabilizer. The recovery of the original shape of the test specimens after rolling deformation was improved to a quite crucial degree. The use of exclusively low molecular weight silicone additives (compounds of the formula (1b)) leads to collapse in hot-cure flexible PU foam formulations. Combinations of a high molecular weight foam stabilizer (compounds of the formula (1a)) and low molecular weight silicone components (compounds of the formula (1b)) still show sufficient stabilization (settling of less than 2.0 cm), unchanged cell counts (14 to 15 cells per cm) and distinct advantages in the rolling test.

The hot-cure flexible PU foams according to the invention are also found to have low emissions if emissions-optimized additives are used. This can be seen in the VOC tests according to DIN EN ISO 16000-9:2008-04. It is found here, in a low-emissions formulation, that total emissions are slightly increased when silicone additive 1 is added (from 40 g/m$^3$, cf. Table 8, to 130 μg/m$^3$, cf. Table 9), but are nevertheless still well below the typical limits for TVOC of 500 μg/m$^3$. The silicone additive 1 is thus also highly suitable for use in low-emissions formulations.

The overall advantageousness of the invention has also been confirmed in the case of viscoelastic flexible foams.

TABLE 8

VOC tests according to DIN EN ISO 16000-9: 2008-04: (reference hot-cure PU flexible foam)

| Sample name: | Reference |
|---|---|
| Instrument: | 7890/5975C |
| Sample volume: | 2.000 l |
| Mass of standard: | 0.396 μg |
| Area of standard: | 129693683 |

| Retention time [min] | Area | Concentration equivalent to toluene | |
|---|---|---|---|
| 4.6 | 510950 | <1 μg/m³ | |
| 5.1 | 593475 | <1 μg/m³ | |
| 5.9 | 534225 | <1 μg/m³ | |
| 6.4 | 957326 | 1 μg/m³ | dimethylsilanediol |
| 22.1 | 3381605 | 5 μg/m³ | ethylhexanoic acid |
| 23.5 | 2598228 | 4 μg/m³ | cyclic siloxane D5 |
| 25.4 | 940103 | 1 μg/m³ | |
| 29.0 | 8728324 | 13 μg/m³ | branched alkanes |
| 29.4 | 4122469 | 6 μg/m³ | branched alkanes |
| 29.6 | 3680639 | 6 μg/m³ | branched alkanes |
| 29.7 | 2462516 | 4 μg/m³ | branched alkanes |
| 41.3 | 542066 | <1 μg/m³ | |
| Total (TVOC) | | 40 μg/m³ | |

Siloxane emissions (total) 5 μg/m³

TABLE 9

VOC tests according to DIN EN ISO 16000-9: 2008-04: (reference hot-cure PU flexible foam + 1.0 part silicone additive 1)

| Sample name: | Reference + silicone additive 1 |
|---|---|
| Instrument: | 7890/5975C |
| Sample volume: | 2.000 l |
| Mass of standard: | 0.396 μg |
| Area of standard: | 117796486 |

| Retention time [min] | Area | Concentration equivalent to toluene | |
|---|---|---|---|
| 4.3 | 1241210 | 2 μg/m³ | |
| 4.4 | 904874 | 2 μg/m³ | |
| 4.6 | 813896 | 1 μg/m³ | |
| 5.1 | 803280 | 1 μg/m³ | |
| 6.0 | 1775599 | 3 μg/m³ | benzene |
| 6.5 | 1756844 | 3 μg/m³ | dimethylsilanediol |
| 8.8 | 2026275 | 3 μg/m³ | |
| 17.3 | 1528105 | 3 μg/m³ | cyclic siloxane D4 |
| 20.3 | 1676694 | 3 μg/m³ | linear siloxane N4 |
| 22.1 | 3887341 | 7 μg/m³ | ethylhexanoic acid |
| 23.5 | 6367115 | 11 μg/m³ | cyclic siloxane D5 |
| 26.5 | 8835334 | 15 μg/m³ | linear siloxane N5 |
| 29.0 | 11993451 | 20 μg/m³ | branched alkanes |
| 29.4 | 5008151 | 8 μg/m³ | branched alkanes |
| 29.6 | 4203748 | 7 μg/m³ | branched alkanes |
| 29.7 | 2903703 | 5 μg/m³ | branched alkanes |
| 31.2 | 3916492 | 7 μg/m³ | linear siloxane N6 |
| 34.3 | 2291055 | 4 μg/m³ | linear siloxane N7 |
| 36.5 | 7455648 | 13 μg/m³ | linear siloxane N8 |
| 38.4 | 4932388 | 8 μg/m³ | linear siloxane N9 |
| 42.1 | 1213236 | 2 μg/m³ | |
| Total (TVOC) | | 130 μg/m³ | |
| Siloxane emissions (total) | | 67 μg/m³ | |

The invention claimed is:

1. A shaped hot-cure flexible polyurethane foam article, wherein the hot-cure flexible PU foam is obtained by reaction of at least one polyol component and at least one isocyanate component in the presence of at least one compound of formula (1a) and at least one compound of formula (1b) and at least one blowing agent and at least one catalyst, where:

$$[R^1Me_2SiO_{1/2}]_a[Me_2SiO_{2/2}]_b[R^2MeSiO_{2/2}]_c[MeSiO_{3/2}]_d[SiO_{4/2}]_e \quad \text{Formula (1a)}$$

with
a=2 to 10,
b=25 to 200,
c=2 to 40,
d=0 to 10,
e=0 to 5,
where:
a+b+c+d+e>48
$R^1$=Me or $R^2$
$R^2$=identical or different polyethers obtained from the polymerization of ethylene oxide, propylene oxide and/or other alkylene oxides and where $$[R^4Me_2SiO_{1/2}]_i[Me_2SiO_{2/2}]_j[R^5MeSiO_{2/2}]_k[MeSiO_{3/2}]_l[SiO_{4/2}]_m \quad \text{Formula (1b)}$$

with
i=2 to 10,
j=0 to 20,
k=0 to 20,
l=0 to 10,
m=0 to 5,
where:
i+j+k+l+m<20
$R^4$=Me or $R^5$
$R^5$=identical or different polyethers obtained from the polymerization of ethylene oxide, propylene oxide and/or other alkylene oxides,
wherein the finished polyurethane foam comprises 0.1% to 5% by weight of the at least one compound having the formula (1a) and comprises 0.1% to 5% by weight of the at least one compound of formula (1b),
and wherein the finished polyurethane foam comprises the at least one compound having the formula (1a) and the at least one compound of formula (1b) in a total amount of about 1.45% to 10.0% by weight.

2. The shaped hot-cure flexible polyurethane foam article according to claim 1, wherein the hot-cure flexible polyurethane foam has a porosity of 1 to 6 scfm.

3. The shaped hot-cure flexible polyurethane foam article according to claim 1, wherein the hot-cure flexible polyurethane foam has a rebound resilience of 1% to 50%, measured in accordance with DIN EN ISO 8307:2008-03, and/or a foam density of 5 to 150 kg/m³ and/or a porosity of 1 to 6 scfm.

4. The shaped hot-cure flexible polyurethane foam article according to claim 1, wherein the hot-cure flexible polyurethane foam has a compressive strength CLD, 40% in accordance with DIN EN ISO 3386-1:2015-10, of 0.1 to 8.0 kPa.

5. The shaped hot-cure flexible polyurethane foam article according to claim 1, wherein the hot-cure flexible polyurethane foam has a compressive strength CLD, 40% in accordance with DIN EN ISO 3386-1:2015-10, of 2.0-8.0 kPa and/or a rebound resilience of 15-50%, measured in accordance with DIN EN ISO 8307:2008-03, and/or a foam density of 8 to 80 kg/m³ and/or a porosity of 1 to 6 scfm.

6. The shaped hot-cure flexible polyurethane foam article according to claim 1, wherein the hot-cure flexible polyurethane foam is a viscoelastic flexible polyurethane foam and has a glass transition temperature between −20° C. and +15° C. and/or a compressive strength CLD, 40% in accordance with DIN EN ISO 3386-1:2015-10, of 0.1-5.0 kPa, in particular 0.5-2.5 kPa, and/or a rebound resilience of <10%, measured in accordance with DIN EN ISO 8307:2008-03, and/or a foam density of 30 to 130 kg/m³ and/or a porosity of 1 to 6 scfm.

7. The shaped hot-cure flexible polyurethane foam article according to claim 1, wherein the shaped article has a height of from at least 1 cm to not more than 50 cm and a width of from at least 20 cm to not more than 300 cm, and a length of from at least 20 cm to not more than 300 cm.

8. The shaped hot-cure flexible polyurethane foam article according to claim 1, wherein based on its starting volume the shaped PU foam article is compressed by at least 20%, and kept in compressed form by packaging means, for at least 20 hours.

9. The shaped hot-cure flexible polyurethane foam article according to claim 8, wherein the shaped hot-cure flexible polyurethane foam article is in a compressed and a vacuum-packed state, and is a roll-up mattress.

10. The shaped hot-cure flexible polyurethane foam article according to claim 1, wherein the at least one polyol component comprises recycled polyols.

11. The shaped hot-cure flexible polyurethane foam article as defined in claim 1, for improving the dimensional recovery of the shaped hot-cure flexible polyurethane foam articles after compression thereof over a period of at least 20 hours, wherein the hot-cure flexible polyurethane foam has a porosity of 1.75 to 4.25 scfm.

12. A process for storing and/or for transporting shaped hot-cure flexible polyurethane foam articles, comprising:
   (a) in a first step providing a shaped hot-cure flexible polyurethane foam article as defined in claim 1,
   (b) in optional subsequent steps the shaped hot-cure flexible polyurethane foam article obtained is subjected to further processing,
   (c) and wherein in a final step the shaped hot-cure flexible polyurethane foam article is compressed by at least 20%, based on its starting volume, and optionally vacuum-packed and kept in compressed form by auxiliary means, and sent for storage and/or transport,
wherein the hot-cure flexible polyurethane foam has a porosity of 1 to 6 scfm.

13. A process for producing hot-cure flexible polyurethane foam having a porosity of 1 to 6 scfm,
   comprising reacting at least one polyol component and at least one isocyanate component in the presence of at least one compound of formula (1a) and at least one compound of formula (1b) and at least one blowing agent and at least one catalyst,
where formulae (1a) and (1b) are defined below:

$$[R^1Me_2SiO_{1/2}]_a[Me_2SiO_{2/2}]_b[R^2MeSiO_{2/2}]_c[MeSiO_{3/2}]_d[SiO_{4/2}]_e \quad \text{Formula (1a)}$$

with
   a=2 to 10,
   b=25 to 200,
   c=2 to 40,
   d=0 to 10,
   e=0 to 5,
   where:
   a+b+c+d+e>48
   $R^1$=Me or $R^2$ $R^2$=polyethers of the general formula (c), $$-\!\!+\!\!CH_2\!\!+_{\!f}\!\!-O\!-\!\!+\!\!C_2H_4O\!\!+_{\!g}\!\!+\!\!C_3H_6O\!\!+_{\!h}\!\!-R^3 \quad \text{Formula (c)}$$

where
f=0-6,
g=0 to 150,
h=0 to 150,
where
g+h>0
$R^3$=OH, alkyl or acetyl,
and where $$[R^4Me_2SiO_{1/2}]_i[Me_2SiO_{2/2}]_j[R^5MeSiO_{2/2}]_k[MeSiO_{3/2}]_l[SiO_{4/2}]_m \quad \text{Formula (1b)}$$

with
   i=2 to 10,
   j=0 to 20,
   k=0 to 20,
   l=0 to 10,
   m=0 to 5,
   where:
   i+j+k+l+m<20
   $R^4$=Me or $R^5$
   $R^5$=polyethers of the general formula (d), or alkyl $C_3$ to $C_{15}$, $$-\!\!+\!\!CH_2\!\!+_{\!n}\!\!-O\!-\!\!+\!\!C_2H_4O\!\!+_{\!o}\!\!+\!\!C_3H_6O\!\!+_{\!p}\!\!-R^6 \quad \text{Formula (d)}$$

where
n=0-6,
o=0 to 100,
p=0 to 100,
where
o+p>0
$R^6$=OH, alkyl or acetyl,
   wherein the finished polyurethane foam comprises the at least one compound having the formula (1a) and the at least one compound of formula (1b) in a total amount of about 1.45% to 10.0% by weight.

14. The shaped hot-cure flexible polyurethane foam article according to claim 8, which is a mattress having improved dimensional recovery after compression over a period of at least 20 hours, having improved emissions characteristics, wherein the hot-cure flexible polyurethane foam has a porosity of 1 to 6 scfm.

15. A mixture comprising at least one compound of the formula (1b) and at least one compound of the formula (1a), and optionally glycols, polyethers, organic esters and/or other solvents suitable, for the purposes of flexible polyurethane foam production, wherein $$[R^1Me_2SiO_{1/2}]_a[Me_2SiO_{2/2}]_b[R^2MeSiO_{2/2}]_c[MeSiO_{3/2}]_d[SiO_{4/2}]_e \quad \text{Formula (1a)}$$

with
   a=2 to 10,
   b=25 to 200,
   c=2 to 40,
   d=0 to 10,
   e=0 to 5,
   where:
   a+b+c+d+e>48

$R^1$=Me or $R^2$ $R^2$=identical or different polyethers obtained from the polymerization of ethylene oxide, propylene oxide and/or other alkylene oxides, and

  Formula (1b)

with
i=2 to 10,
j=0 to 20,
k=0 to 20,
l=0 to 10,
m=0 to 5,
where:
i+j+k+l+m<20
$R^4$=Me or $R^5$
$R^5$=identical or different polyethers obtained from the polymerization of ethylene oxide, propylene oxide and/or other alkylene oxides,
wherein the mixture to produce the finished polyurethane foam comprises the at least one compound having the formula (1a) and the at least one compound of formula (1b) in a total amount of about 1.45% to 10.0% by weight.

16. The shaped hot-cure flexible polyurethane foam article according to claim 1, wherein the hot-cure flexible polyurethane foam has a porosity of 1.5 to 4.5 scfm, wherein
a=2 to 8,
b=40 to 150,
c=2 to 30,
d=0 to 8,
e=0 to 3,
where:
$R^2$=polyethers of the general formula (c),

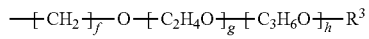  Formula (c)

where
f=0-4,
g=3 to 100,
h=0 to 100,
where
$R^3$=OH, methyl, acetyl or butyl,
and where
i=2 to 8,
j=0 to 18,
k=0 to 15,
l=0 to 8,
m=0 to 3,
where:
$R^5$=polyethers of the general formula (d), or alkyl $C_3$ to $C_{15}$,

  Formula (d)

where
o=0 to 50.

17. The shaped hot-cure flexible polyurethane foam article according to claim 1, wherein the hot-cure flexible polyurethane foam has a porosity of 1.75 to 4.25-scfm,
wherein
a=2 to 5,
b=40 to 150,
where:
$R^2$=polyethers of the general formula (c),

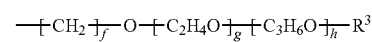  Formula (c)

where
f=0-6,
g=0 to 150,
h=0 to 150,
where
g+h>0
$R^3$=OH,
alkyl or acetyl,
and where
where:
$R^5$=polyethers of the general formula (d), or alkyl $C_3$ to $C_{15}$,

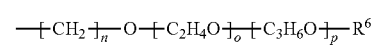  Formula (d)

where
n=0-6,
o=0 to 100,
p=0 to 100,
where
o+p>0
$R^6$=OH, alkyl or acetyl.

18. The shaped hot-cure flexible polyurethane foam article according to claim 1, wherein the hot-cure flexible polyurethane foam has a porosity of 1.5 to 4.5 scfm,
wherein
a=2 to 8,
b=40 to 150,
c=2 to 30,
d=0 to 8,
e=0 to 3,
where:
$R^2$=polyethers of the general formula (c),

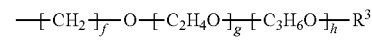  Formula (c)

where
f=0-4,
g=3 to 100,
h=0 to 100,
where
g+h>0
$R^3$=OH, methyl, acetyl or butyl
and where
i=2 to 8,
j=0 to 18,
k=0 to 15,
l=0 to 8,
m=0 to 3, where:
$R^5$=polyethers of the general formula (d), or alkyl $C_3$ to $C_{15}$, $$-\!\!\!-\!\!(CH_2)_n\!\!-\!\!O\!\!-\!\!(C_2H_4O)_o\!\!-\!\!(C_3H_6O)_p\!\!-\!\!R^6 \qquad \text{Formula (d)}$$

where
n=0-4,
l=0 to 50,
p=0 to 50,
where
o+p>0
$R^6$=OH, methyl, acetyl or butyl.

19. The shaped hot-cure flexible polyurethane foam article according to claim 1, wherein the hot-cure flexible polyurethane foam has a porosity of 1.5 to 4.5 scfm, wherein
a=2 to 8,
b=40 to 150,
c=2 to 30,
d=0 to 8,
e=0 to 3,
where:
a+b+c+d+e>48
$R^1$=Me or $R^2$
$R^2$=polyethers of the general formula (c), $$-\!\!\!-\!\!(CH_2)_f\!\!-\!\!O\!\!-\!\!(C_2H_4O)_g\!\!-\!\!(C_3H_6O)_h\!\!-\!\!R^3 \qquad \text{Formula (c)}$$

where
f=0-3,
g=3 to 70,
h=0 to 80,
where
g+h>0
$R^3$=OH, methyl, acetyl or butyl
and where
i=2 to 8,
j=0 to 18,
k=0 to 15,
l=0 to 8,
m=0 to 3,
where:
i+j+k+l+m<20
$R^4$=Me or $R^5$
$R^5$=polyethers of the general formula (d), or alkyl $C_3$ to $C_{15}$, $$-\!\!\!-\!\!(CH_2)_n\!\!-\!\!O\!\!-\!\!(C_2H_4O)_o\!\!-\!\!(C_3H_6O)_p\!\!-\!\!R^6 \qquad \text{Formula (d)}$$

where
n=0-3,
o=0 to 25,
p=0 to 25,
where
o+p>0
$R^6$=OH, methyl, acetyl or butyl.

20. The shaped hot-cure flexible polyurethane foam article according to claim 1, wherein:

$$[R^1Me_2SiO_{1/2}]_a[Me_2SiO_{2/2}]_b[R^2MeSiO_{2/2}]_c[MeSiO_{3/2}]_d[SiO_{4/2}]_e \qquad \text{Formula (1a)}$$

with
a=2
b=70
c=4
d=0
e=0
with
a+b+c+d+e=76
$R^1$=Me or $R^2$
$R^2$=identical or different polyethers obtained from the polymerization of ethylene oxide, propylene oxide and/or other alkylene oxides and
where $$[R^4Me_2SiO_{1/2}]_i[Me_2SiO_{2/2}]_j[R^5MeSiO_{2/2}]_k[MeSiO_{3/2}]_l[SiO_{4/2}]_m \qquad \text{Formula (1b)}$$

with
i=2
j=0, 4 or distribution 2 to 15, maximum at 9
k=0, 1, or 2
l=0
m=0
with
i+j+k+l+m=3, 8 or distribution 4 to 17, maximum at 11
$R^4$=Me
$R^5$=n-octyl or polyether 1 of formula f:

$$-\!\!\!-\!\!(CH_2)_n\!\!-\!\!O\!\!-\!\!(C_2H_4O)_o\!\!-\!\!(C_3H_6O)_p\!\!-\!\!R^6$$

where:
n=3
o=3.5
p=2.0
where
O+p=5.5
$R^6$=OH.

21. The shaped hot-cure flexible polyurethane foam article according to claim 1, wherein the finished polyurethane foam comprises 0.25% to 2.0% by weight of the at least one compound having the formula (1a) and comprises 0.1% to 1.5% by weight of the at least one compound of formula (1b).

22. A shaped hot-cure flexible polyurethane foam article, wherein the hot-cure flexible PU foam is obtained by reaction of at least one polyol component and at least one isocyanate component in the presence of at least one compound of formula (1a) and at least one compound of formula (1b) and at least one blowing agent and at least one catalyst, where:

$$[R^1Me_2SiO_{1/2}]_a[Me_2SiO_{2/2}]_b[R^2MeSiO_{2/2}]_c[MeSiO_{3/2}]_d[SiO_{4/2}]_e \qquad \text{Formula (1a)}$$

with
a=2 to 10,
b=25 to 200,
c=2 to 40,
d=0 to 10
e=0 to 5,
where:
a+b+c+d+e>48
$R^1$=Me or $R^2$ $R^2$=identical or different polyethers obtained from the polymerization of ethylene oxide propylene oxide and/or other alkylene oxides
and where $$[R^4Me_2SiO_{1/2}]_i[Me_2SiO_{2/2}]_j[R^5MeSiO_{2/2}]_k[MeSiO_{3/2}]_l[SiO_{4/2}]_m \quad \text{Formula (1b)}$$

with
i=2 to 10,
j=0 to 20
k=0 to 20
l=0 to 10,
m=0 to 5,
where:
i+j+k+l+m<20
$R^4$=Me or $R^5$
$R^5$=identical or different polyethers obtained from the polymerization of ethylene oxide, propylene oxide and/or other alkylene oxides,
which does not comprise a surfactant other than compounds of formula (1a) and formula (1b).

* * * * *